United States Patent
Wu et al.

(10) Patent No.: US 12,498,476 B2
(45) Date of Patent: Dec. 16, 2025

(54) TECHNIQUES FOR JOINT SIDELINK POSITIONING

(71) Applicant: QUALCOMM Incorporated, San Diego, CA (US)

(72) Inventors: Shuanshuan Wu, San Diego, CA (US); Gene Wesley Marsh, San Diego, CA (US); Shailesh Patil, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 18/153,095

(22) Filed: Jan. 11, 2023

(65) Prior Publication Data
US 2024/0230885 A1 Jul. 11, 2024

(51) Int. Cl.
*G01S 13/87* (2006.01)
*G01S 13/76* (2006.01)

(52) U.S. Cl.
CPC .......... *G01S 13/878* (2013.01); *G01S 13/765* (2013.01)

(58) Field of Classification Search
CPC .... G01S 13/878; G01S 13/765; G01S 5/0289; G01S 13/876; G01S 5/0072; G01S 5/01; H04W 64/006
See application file for complete search history.

(56) References Cited

U.S. PATENT DOCUMENTS

| 2009/0209268 | A1 | 8/2009 | Ha et al. |
| 2019/0250241 | A1* | 8/2019 | Alawieh ............. G01S 5/02213 |
| 2022/0244344 | A1 | 8/2022 | Bao et al. |
| 2025/0106815 | A1* | 3/2025 | Hu ...................... H04W 64/006 |
| 2025/0168808 | A1* | 5/2025 | Ramachandran ..... H04W 24/10 |

FOREIGN PATENT DOCUMENTS

WO 2022155050 7/2022

OTHER PUBLICATIONS

International Search Report and Written Opinion—PCT/US2023/080993—ISA/EPO—Mar. 20, 2024.

* cited by examiner

*Primary Examiner* — Fred A Casca
(74) *Attorney, Agent, or Firm* — Thien T. Nguyen

(57) ABSTRACT

Disclosed are techniques for wireless communication. In an aspect, a device may obtain first one or more anchor-to-target round-trip time (RTT) measurements corresponding to one or more respective RTT operations between a first target user equipment (UE) and first one or more anchor devices. The device may obtain second one or more anchor-to-target RTT measurements corresponding to one or more respective RTT operations between a second target UE and second one or more anchor devices. The device may obtain a target-to-target RTT measurement corresponding to an RTT operation between the first target UE and the second target UE. The device may determine at least a first estimated position of the first target UE based on the first one or more anchor-to-target RTT measurements, the second one or more anchor-to-target RTT measurements, and the target-to-target RTT measurement.

30 Claims, 16 Drawing Sheets

TECHNIQUES FOR JOINT SIDELINK POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a device includes obtaining first one or more anchor-to-target round-trip time (RTT) measurements corresponding to one or more respective RTT operations between a first target user equipment (UE) and first one or more anchor devices; obtaining second one or more anchor-to-target RTT measurements corresponding to one or more respective RTT operations between a second target UE and second one or more anchor devices; obtaining a target-to-target RTT measurement corresponding to an RTT operation between the first target UE and the second target UE; and determining at least a first estimated position of the first target UE based on the first one or more anchor-to-target RTT measurements, the second one or more anchor-to-target RTT measurements, and the target-to-target RTT measurement.

In an aspect, a device includes a memory; and at least one processor communicatively coupled to the memory, the at least one processor configured to: obtain first one or more anchor-to-target round-trip time (RTT) measurements corresponding to one or more respective RTT operations between a first target user equipment (UE) and first one or more anchor devices; obtain second one or more anchor-to-target RTT measurements corresponding to one or more respective RTT operations between a second target UE and second one or more anchor devices; obtain a target-to-target RTT measurement corresponding to an RTT operation between the first target UE and the second target UE; and determine at least a first estimated position of the first target UE based on the first one or more anchor-to-target RTT measurements, the second one or more anchor-to-target RTT measurements, and the target-to-target RTT measurement.

In an aspect, a device includes means for obtaining first one or more anchor-to-target round-trip time (RTT) measurements corresponding to one or more respective RTT operations between a first target user equipment (UE) and first one or more anchor devices; means for obtaining second one or more anchor-to-target RTT measurements corresponding to one or more respective RTT operations between a second target UE and second one or more anchor devices; means for obtaining a target-to-target RTT measurement corresponding to an RTT operation between the first target UE and the second target UE; and means for determining at least a first estimated position of the first target UE based on the first one or more anchor-to-target RTT measurements, the second one or more anchor-to-target RTT measurements, and the target-to-target RTT measurement.

In an aspect, a non-transitory computer-readable medium stores computer-executable instructions that, when executed by a device, cause the device to: obtain first one or more anchor-to-target round-trip time (RTT) measurements corresponding to one or more respective RTT operations between a first target user equipment (UE) and first one or more anchor devices; obtain second one or more anchor-to-target RTT measurements corresponding to one or more respective RTT operations between a second target UE and second one or more anchor devices; obtain a target-to-target RTT measurement corresponding to an RTT operation between the first target UE and the second target UE; and determine at least a first estimated position of the first target UE based on the first one or more anchor-to-target RTT measurements, the second one or more anchor-to-target RTT measurements, and the target-to-target RTT measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
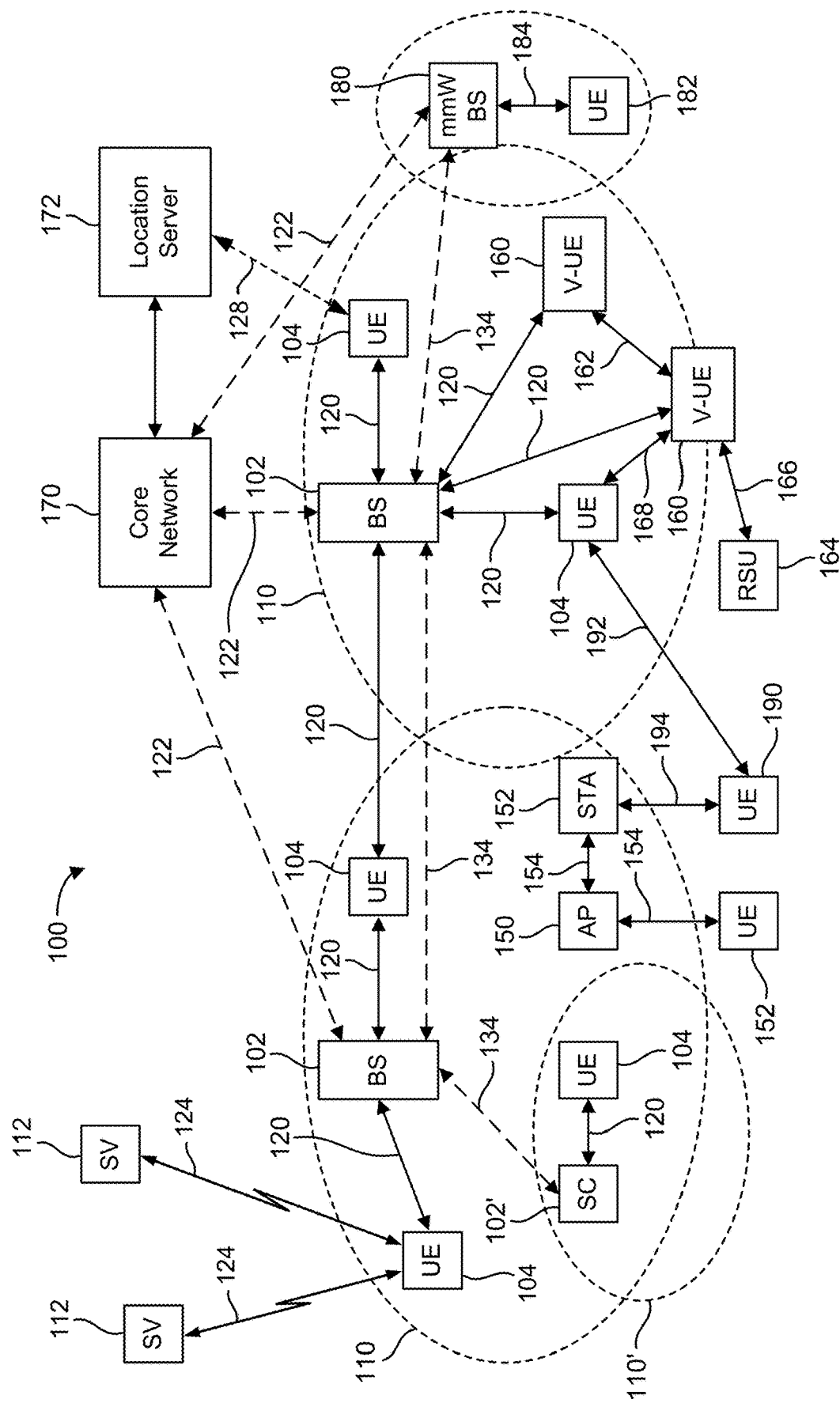
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
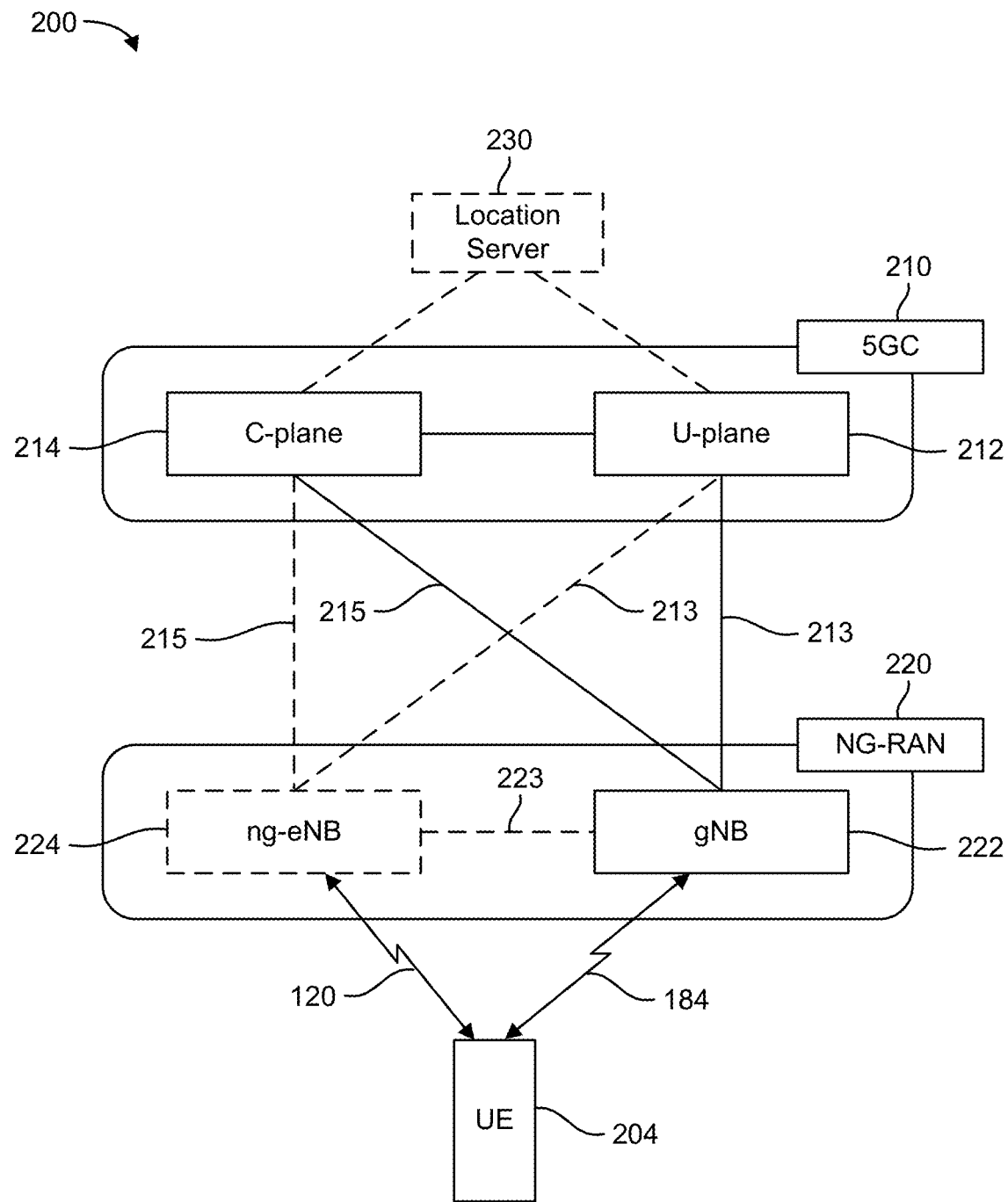
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
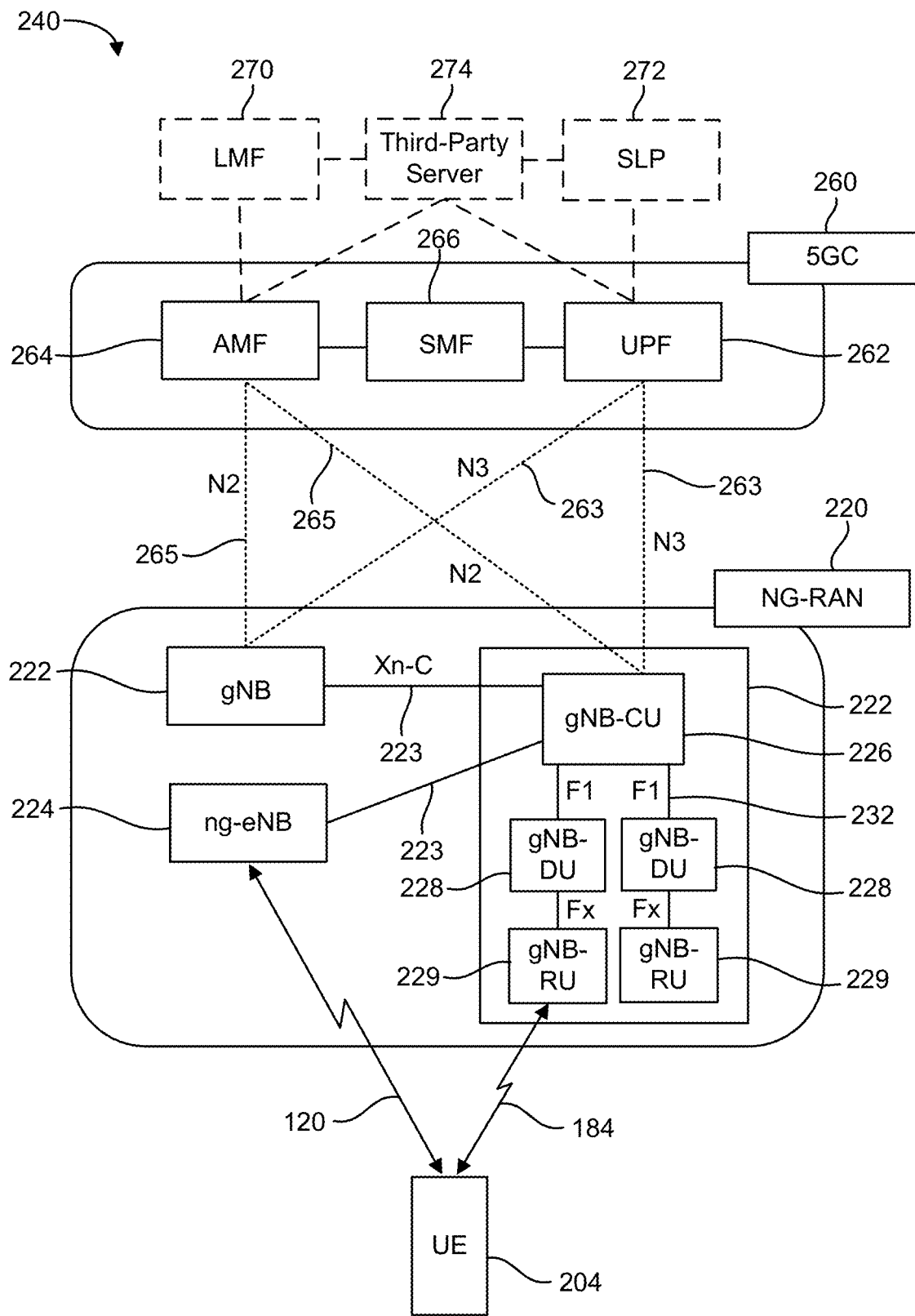

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
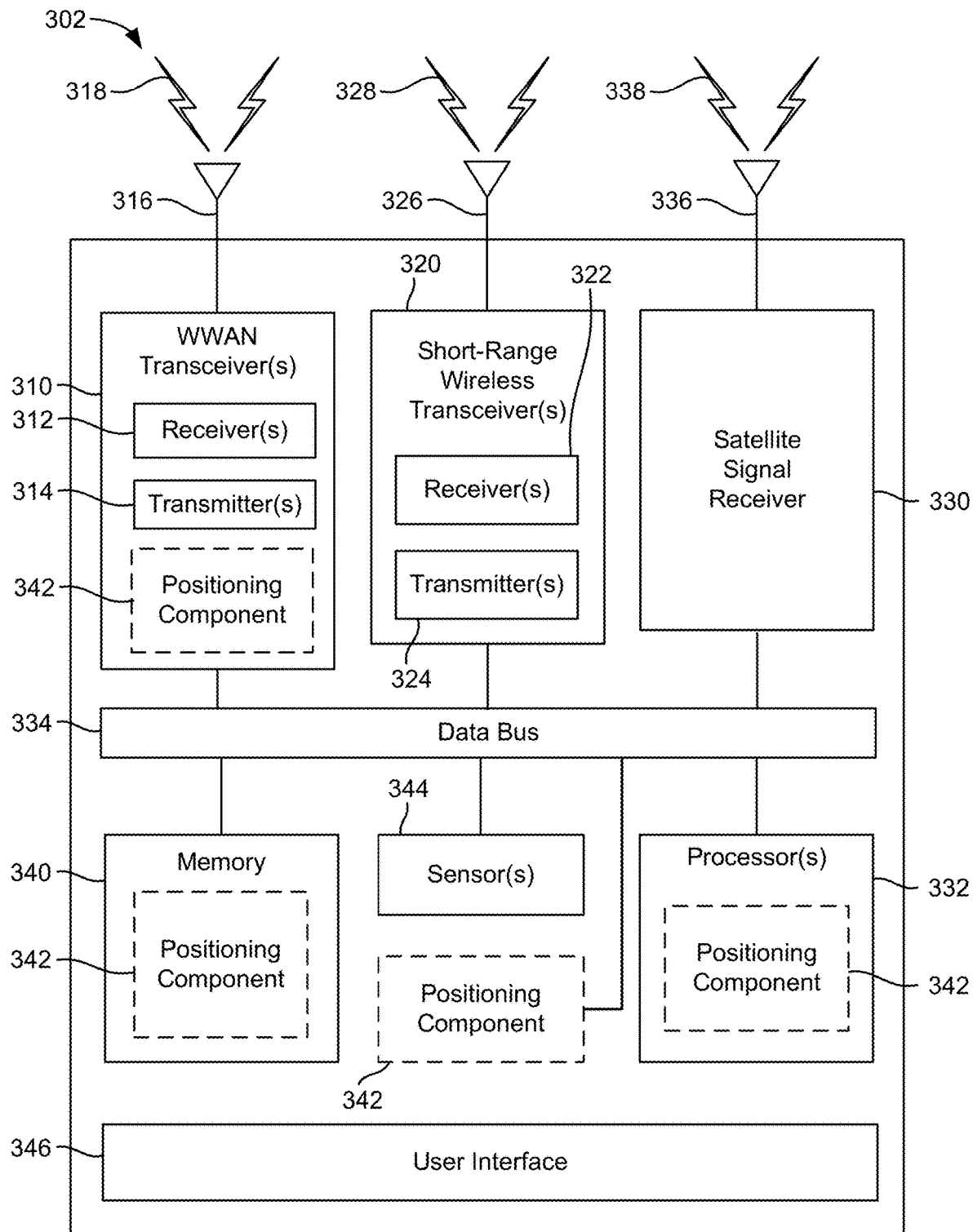
FIGS. 3A, 3B, and 3C are simplified block diagrams of several sample aspects of components that may be employed in a user equipment (UE), a base station, and a network entity, respectively, and configured to support communications as taught herein.
Figure 3B:
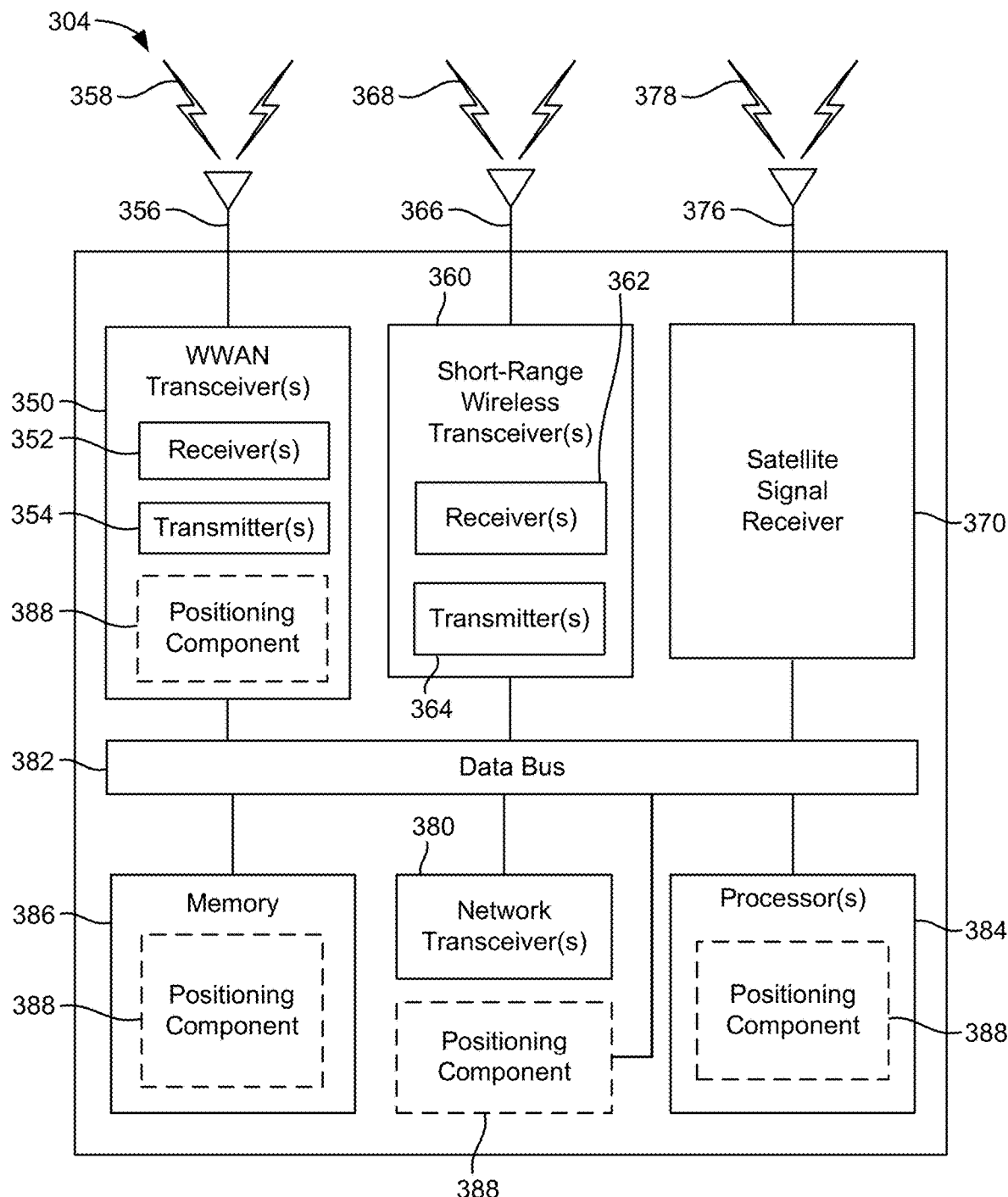
Figure 3C:
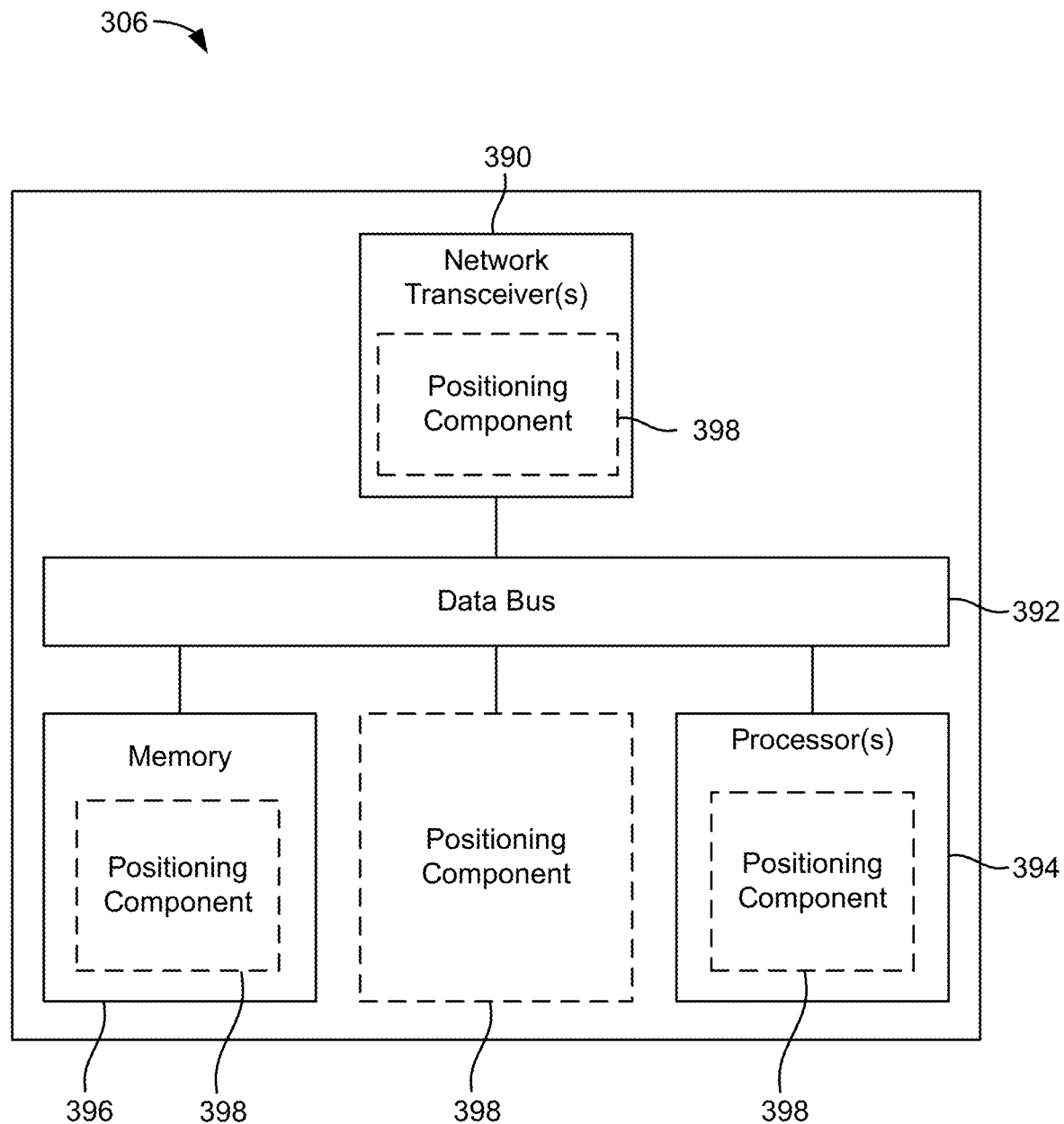

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
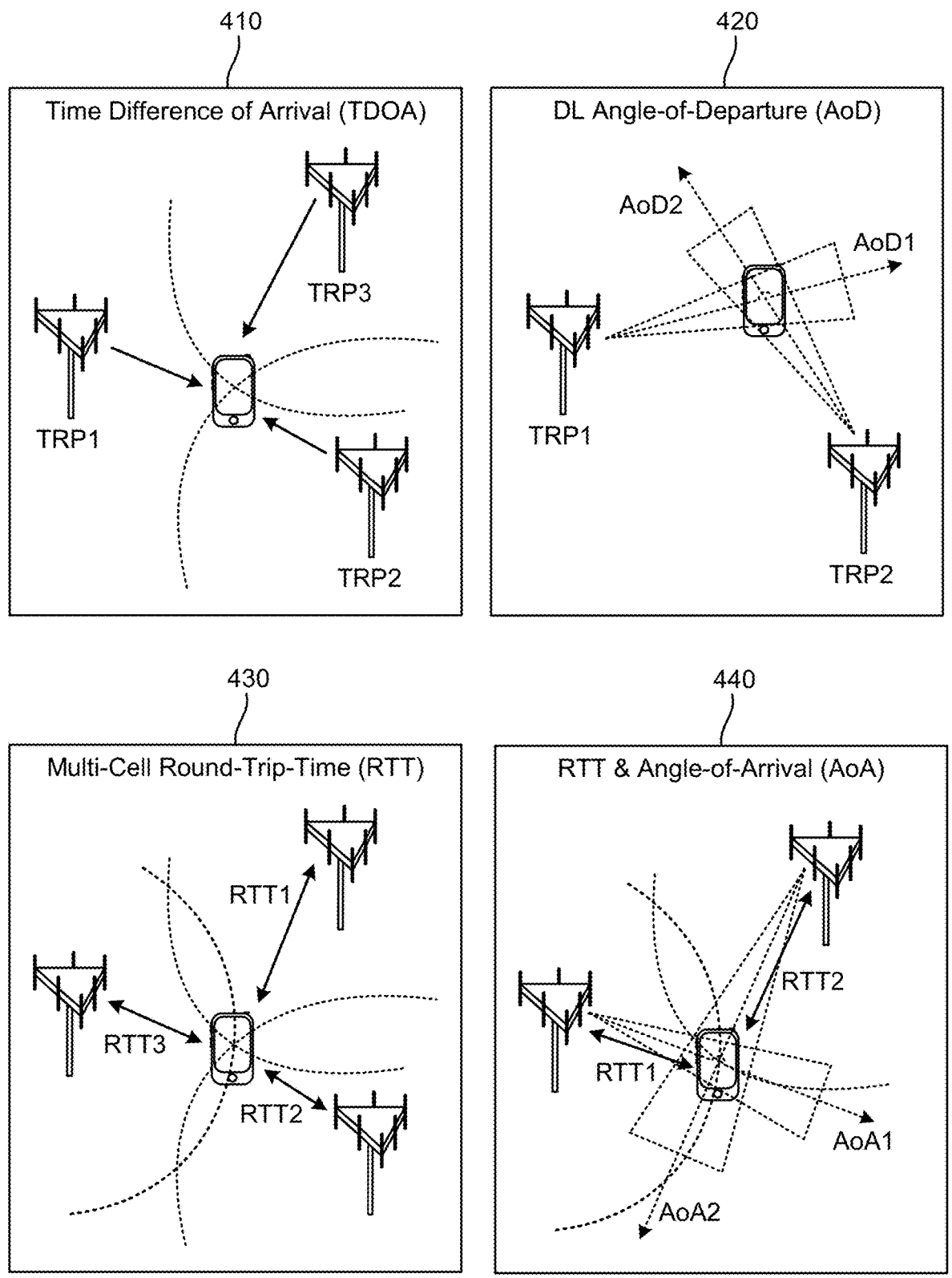
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5A:
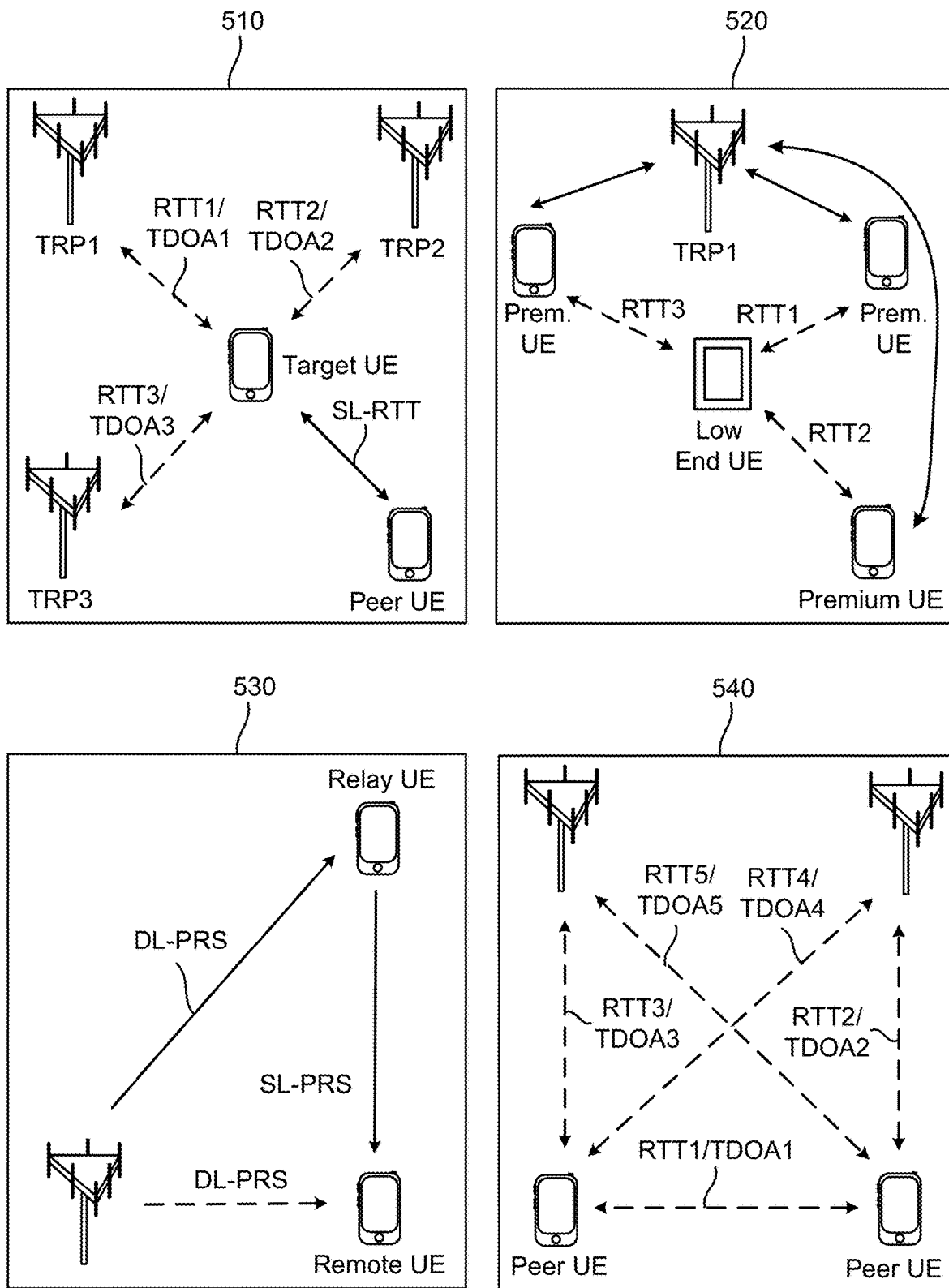
FIGS. 5A and 5B illustrate various scenarios of interest for sidelink-only or joint Uu and sidelink positioning, according to aspects of the disclosure.

NR supports, or enables, various sidelink positioning techniques. FIG. 5A illustrates various scenarios of interest for sidelink-only or joint Uu and sidelink positioning, according to aspects of the disclosure. In scenario 510, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 520, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 530, a relay UE (e.g., with a known location) participates in the positioning estimation of a remote UE without performing uplink positioning reference signal (PRS) transmission over the Uu interface. Scenario 540 illustrates the joint positioning of multiple UEs. Specifically, in scenario 540, two UEs with unknown positions can be jointly located in non-line-of-sight (NLOS) conditions by utilizing constraints from nearby UEs.

Figure 5B:
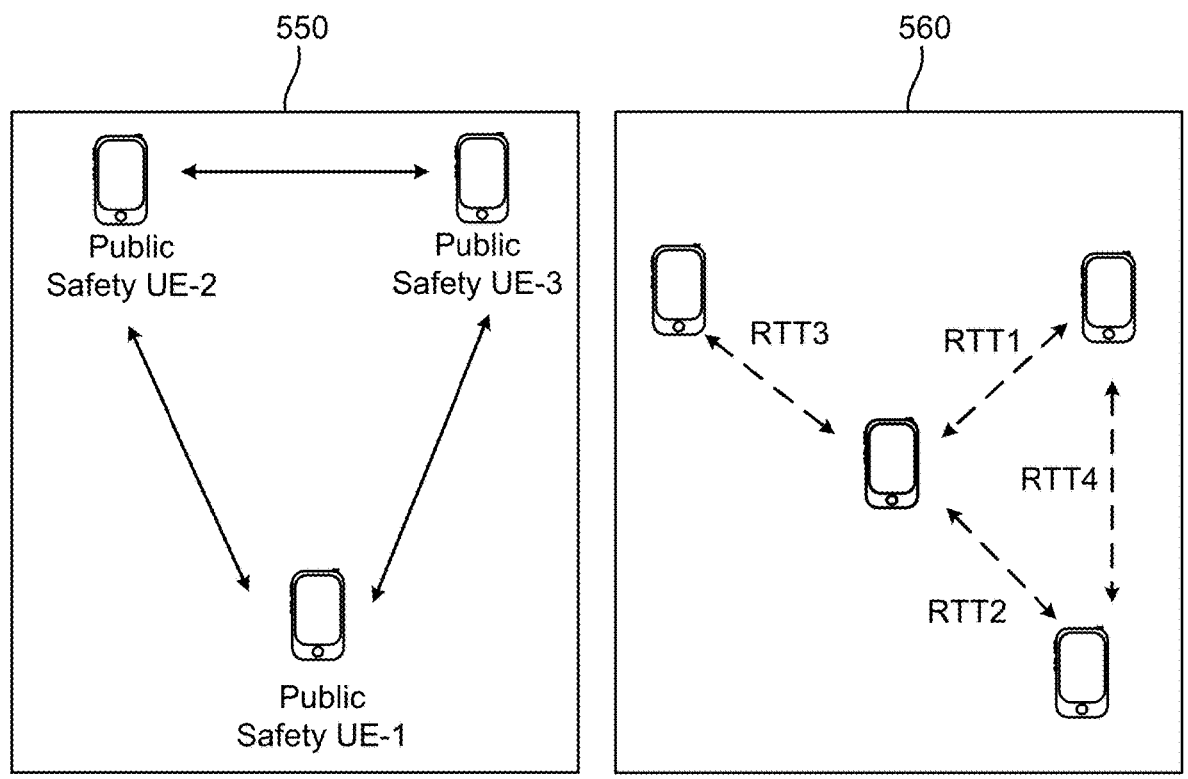

FIG. 5B illustrates additional scenarios of interest for sidelink-only or joint Uu and sidelink positioning, according to aspects of the disclosure. In scenario 550, UEs used for public safety (e.g., by police, firefighters, and/or the like) may perform peer-to-peer (P2P) positioning and ranging for public safety and other uses. For example, in scenario 550, the public safety UEs may be out of coverage of a network and determine a location or a relative distance and a relative position among the public safety UEs using sidelink positioning techniques. Similarly, scenario 560 shows multiple UEs that are out of coverage and determine a location or a relative distance and a relative position using sidelink positioning techniques, such as SL-RTT.

Figure 6:
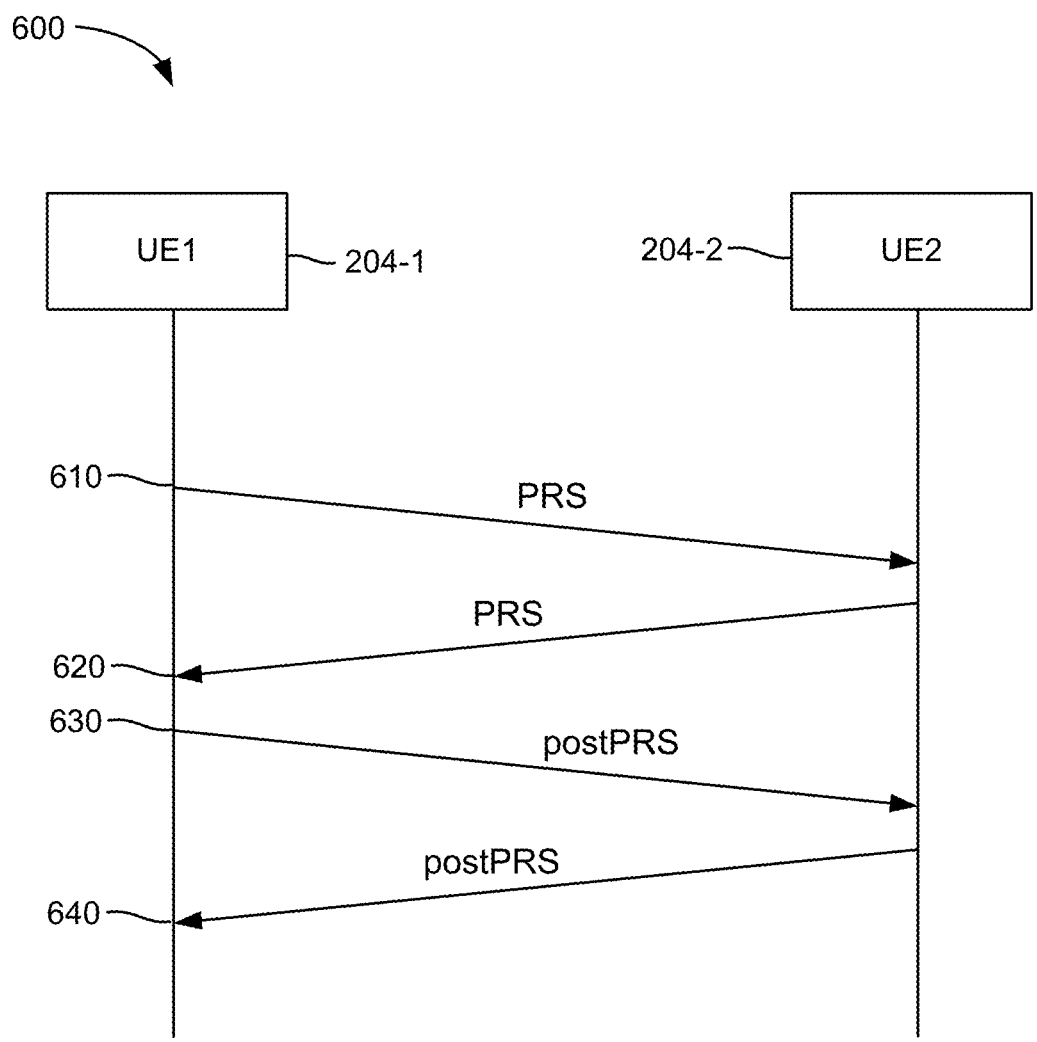
FIG. 6 illustrates an example sidelink ranging and positioning procedure, according to aspects of the disclosure.

FIG. 6 illustrates an example sidelink ranging and positioning procedure 600, according to aspects of the disclosure. The sidelink ranging and positioning procedure 600 may also be referred to as a sidelink RTT positioning procedure. Sidelink ranging is based on calculating an inter-UE RTT measurement, as determined from the transmit and receive times of PRS (e.g., SL-PRS). Each UE reports an RTT measurement to all other participating UEs, along with its location (if known). For UEs having zero or inaccurate knowledge of their location, the RTT procedure may yield an inter-UE range between the involved UEs. For UEs having accurate knowledge of their location, the range may yield an absolute location.

As shown in FIG. 6, after initial signaling between UE1 204-1 and UE2 204-2 to engage in a sidelink positioning session, at stages 610 and 620, UEs 204-1 and 204-2 transmit PRS (e.g., SL-PRS) to each other. The resources on which the PRS are transmitted may be configured/allocated by the network (e.g., one of the UE's serving base station) or negotiated by the UEs 204-1 and 204-2. The UE1 204-1 measures the transmission-to-reception (Tx-Rx) time difference between the transmission time of PRS at stage 610 and the reception time of PRS at stage 620. The UE2 204-2 measures the reception-to-transmission (Rx-Tx) time difference between the reception time of PRS at stage 610 and the transmission time of PRS at stage 620. Note that although FIG. 6 illustrates the UE1 204-1 transmitting PRS first, the UE2 204-2 may instead transmit PRS first.

At stages 630 and 640, the UEs 204-1 and 204-2 exchange their respective time difference measurements in post PRS messages (labeled "postPRS"). If the UE1 204-1 has not yet provided its location to the UE2 204-2, it does so at this point. Each one of the UEs 204-1 and 204-2 is then able to determine the RTT between the UEs 204-1 and 204-2 based on the Tx-Rx and Rx-Tx time difference measurements (specifically, the difference between the Tx-Rx and Rx-Tx time difference measurements). Based on the RTT measurement and the speed of light, UE 204-1 or 204-2 can then estimate the distance (or range) between the two UEs 204-1 and 204-2 (e.g., half the RTT measurement multiplied by the speed of light). In at least one aspect, the UE2 204-2 has the absolute location (e.g., geographic coordinates) of the UE1 204-1, the UE2 204-2 can use that location and the distance to the UE1 204-1 to determine its own absolute location.

Note that while FIG. 6 illustrates two UEs 204-1 and 204-2, a UE may perform, or attempt to perform, the sidelink ranging and positioning procedure 600 with multiple UEs.

In one aspect, the PRS for the sidelink positioning session or the SL-PRS can have a waveform the same as that of UL-PRS or DL-PRS defined in LTE or NR for positioning, or a waveform that is different from that of UL-PRS or DL-PRS.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and an RSU, similar to a RTT positioning procedure.

In some aspects, various communications standards may provide additional details regarding V2X/sidelink communication and/or sidelink positioning in general. For example, in 3GPP Release 16 and 17 regarding V2X sidelink communications, a number of sidelink signals or sidelink physical channels may be specified for transmission either in a cellular spectrum (i.e., SL shares a spectrum in a licensed cellular band) or in a dedicated intelligent transportation system (ITS) spectrum. In some examples, 3GPP Release 18 may specify sidelink positioning with the focus on the sidelink-based high accuracy positioning for V2X, public safety, and/or commercial use cases. In some aspects, the sidelink positioning may support both relative positioning and absolute positioning. In some aspects, the relative positioning may correspond to determining the distance between two UEs or determining the relative locations of two UEs. In some aspects, the absolute positioning may correspond to determining the geographic coordinates of a target UE.

In some aspects, the sidelink positioning may be performed based on measurements of PRS. In some aspects, the PRS may be SL-PRS transmitted over the sidelink, or CSI-RS or SRS over the sidelink. In some aspects, the sidelink positioning may be based on measurements of ToA, TDoA, AoA, RTT, or a combination thereof, of the SL-PRS, CSI-RS, SRS, or a combination thereof.

In some aspects, according to an SL positioning operation, one or more RSUs may be deployed as positioning anchor devices (or simply referred to as anchors in this disclosure). In some aspects, RSUs may constitute a significant part of V2X networks and ecosystems. The RSUs may be a type of UE and may be usually installed along roads (e.g., co-located with the traffic lights in the urban streets, along the freeway, etc.). In some aspects, one or more RSUs with known locations may serve as positioning anchors for positioning target UEs (e.g., mobile phones or vehicles).

In some aspects, the SL positioning with an RSU may be based on the PRS transmission between a target UE and the RSU. In some aspects, one of the sidelink positioning use cases with the RSUs is to improve the absolute vehicle UE positioning accuracy. For example, positioning based on a global navigation satellite system (GNSS) may not always be very accurate in the urban scenarios, due to GNSS signal reflection, blockage, etc., by buildings. In some aspects, measurements from the SL positioning with an RSU (with its location known) may then be used as another input to be fused with the GNSS location measurement to improve the positioning accuracy. In some aspects, another use case of the SL positioning with the RSU may include positioning a target UE based on measurements from multiple RSUs.

In some aspects, the positioning techniques for the positioning with an RSU may be implemented based on various factors including accuracy requirements, processing time requirements, and/or specific use case. In some aspects, some sidelink/V2X applications may have very high positioning accuracy requirements. For example, a sub-meter level accuracy may be recommended or needed to support the vehicle maneuver coordination.

In some examples, the TDoA positioning may be available, where the target UE may obtain TDoA measurements of reference signals sent by multiple RSUs. In some examples, the RTT positioning may be available, where a target UE and/or an RSU may obtain an RTT measurement (and thus a corresponding distance) between target UE and RSU. In some examples, the TDoA measurements, the RTT measurements, or both, may be used to determine the absolute location of the target UE.

In one example, a positioning procedure of a target UE may be performed based on the RTT measurements with one or more RSUs (e.g., as anchor devices). According to this example, the target UE and the one or more RSUs may exchange reference signals over sidelink (e.g., SL-PRS). In this example, the RTT measurement between the target UE and an RSU may be determined based on measuring the ToA of a responding SL-PRS. In some aspects, the RTT measurements (may be measurable and recorded in time, but may also be recorded in distance) may then be used to compute the absolute location of the target UE.

For example, based on each RTT measurement between a target UE and a corresponding anchor (e.g., an RSU) i, a measured distance between the target UE and the anchor i may be determined. In some aspects, the location of anchor i may be $(a_i, b_i)$, and the position $(x, y)$ of the target UE may satisfy the expression of $(a_i-x)^2+(b_i-y)^2=r_i^2$. The position of the target UE may be determined such that the position $(x, y)$ may minimize the difference between $R_i$ an $r_i$ for all available anchors. In some aspects, at least three RTT measurements with respect to three RSUs (as the anchors) may be needed to determine the absolute location of the target UE.

In some aspects, for the absolute positioning performed based on one or more anchors, the location accuracy of an estimated position of a target UE may depend on the accuracy of signal metric measurements and/or the number of anchors. In some aspects, the accuracy of signal metric measurements (e.g., ToA/RTT, TDoA, AoA, etc.) may depend on the PRS signal bandwidth, the line-of-sight (LOS) condition between the target UE and the anchor, a number of antennas the target UE or the anchor has, the signal quality (e.g., signal-to-noise ratio (SNR) or SINR) of the PRS, or any combination thereof. In some aspects, the number of available anchors may affect the accuracy in determining a target location.

Figure 7:
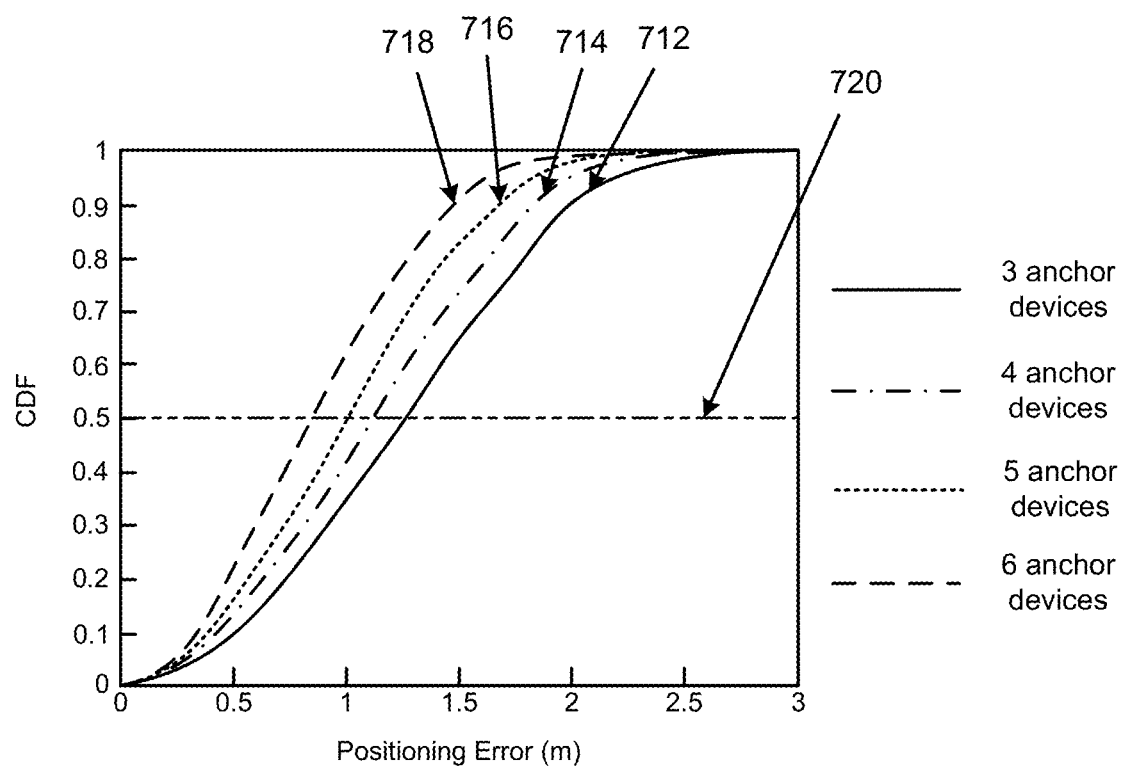
FIG. 7 illustrates simulated positioning errors of positioning procedures performed based on different numbers of anchor devices, according to aspects of the disclosure.

FIG. 7 illustrates simulated positioning errors of positioning procedures performed based on different numbers of anchor devices, according to aspects of the disclosure. As shown in FIG. 7, the horizontal axis represents position errors in meters, and the vertical axis represents cumulative distribution function (CDF) of position errors. Curve 712 represents the simulation result of using three anchor devices; curve 714 represents the simulation result of using four anchor devices; curve 716 represents the simulation result of using five anchor devices; and curve 718 represents the simulation result of using six anchor devices.

As shown in FIG. 7, given a certain accuracy probability, such as at 0.5 as indicated by a reference line 720, the greater the number of anchors and/or measurements used in a positioning procedure, the better the positioning performance of the positioning procedure (e.g., a smaller positioning error) may achieve.

In some aspects, a number of available anchors for a positioning procedure may be limited. For example, the RSUs may be installed along a road and serve as SL positioning anchors. However, from a target UE's perspective, the number of simultaneously available RSUs may be limited due to the factors such as the range to an RSU, a signal quality of the transmission between the target UE and an RSU, an obstacle between the target UE and an RSU, an angular or spatial diversity offered by multiple RSUs, the user subscription for accessing an RSU, or a combination thereof. In other words, a target UE may not expect that the RSUs (as anchor devices) have very dense deployment just for the positioning purpose.

In some aspects, an option to improve the performance of a positioning procedure may be based on a joint positioning procedure (i.e., determining the positions of multiple target UEs jointly). For example, there may be more than one target UEs in an area whose positions are to be determined. Each target UE may obtain the corresponding anchor-to-target RTT measurements with nearby or associated anchors (e.g., an RTT measurement of a round trip time of positioning reference signals exchanged between an anchor device and a target UE). In some aspects, the anchor-to-target RTT measurements of the target UEs (e.g., an RTT measurement of a round trip time of positioning reference signals exchanged between two target UEs) and the corresponding equations for the positioning procedure of the target UEs may be linked by one or more target-to-target RTT measurements between the target UEs. Accordingly, a joint positioning procedure may be performed. In some aspects, the positioning accuracy may be improved by the added information from the one or more target-to-target RTT measurements between the target UEs and the cross-reference of the anchor-to-target RTT measurements, even though the number of anchors may not have been increased.

Figure 8:
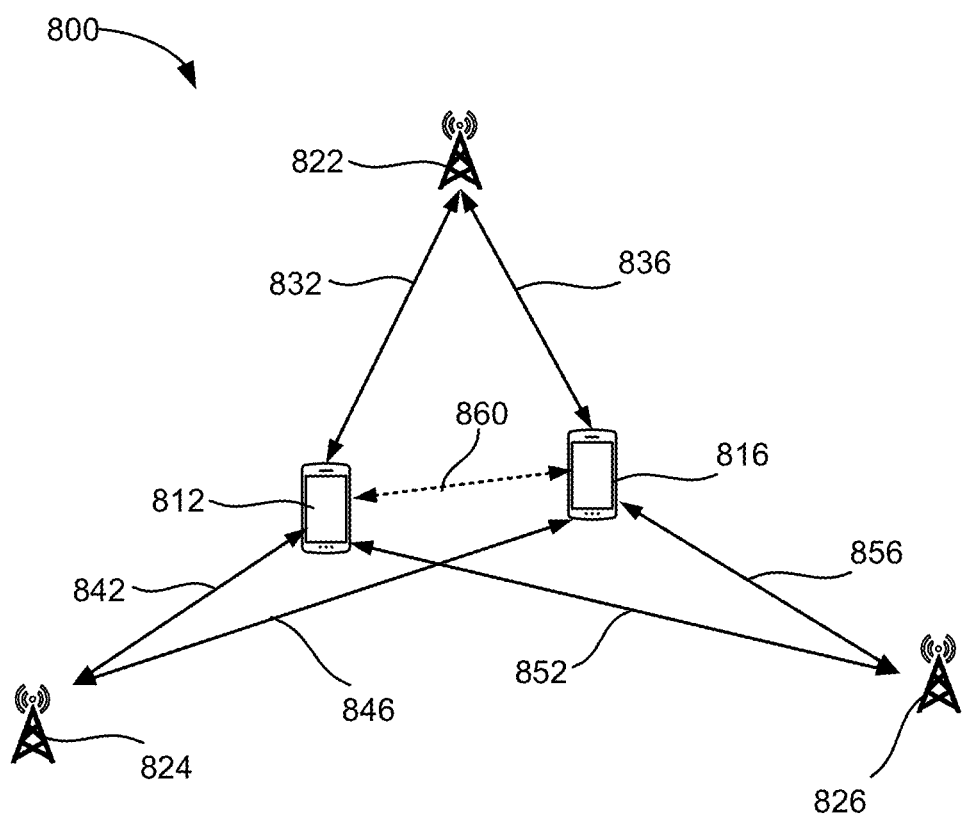
FIG. 8 illustrates an example that includes two target UEs and three anchor devices, according to aspects of the disclosure.

FIG. 8 illustrates an example 800 that includes two target UEs 812 and 816 and three anchor devices 822, 824, and 826, according to aspects of the disclosure. The target UE 812 may engage in RTT operations 832, 842, and 852 with the anchor devices 822, 824, and 826 to obtain corresponding anchor-to-target RTT measurements. The target UE 816 may engage in RTT operations 836, 846, and 856 with the anchor devices 822, 824, and 826 to obtain corresponding anchor-to-target RTT measurements. In addition, the target UE 812 and the target UE 816 may engage in an RTT operation 860 to obtain a target-to-target RTT measurement. Accordingly, a joint positioning procedure may be performed based on the anchor-to-target RTT measurements and the target-to-target RTT measurements to determine the estimated positions of the target UE 812 and the target UE 816.

In some aspects, if the positioning computation is performed by a target UE (i.e., UE based), the RTT measurements between the anchors and other target UE(s) may be sent to the target UE (e.g., the target UE 812), and the one or more RTT measurements between the target UE and the other target UE(s) may be available at the target UE. In some aspects, if the positioning computation is performed by a location server (i.e., UE assisted), the location server may collect all the anchor-to-target RTT measurements, as well as enable and collect the target-to-target RTT measurements. Depending on whether a target UE or a server (e.g., any location server as described in this disclosure) is performing the calculations for the joint positioning procedure, different signaling procedures may be configured.

In at least one example, the joint positioning procedure may be performed based on the target-to-target RTT measurements between target UEs being available. In one example, the joint positioning procedure may be enabled by a location server. In another example, the joint positioning procedure may be requested by a target UE, and may be subject to the approval of a location server.

Figure 9:
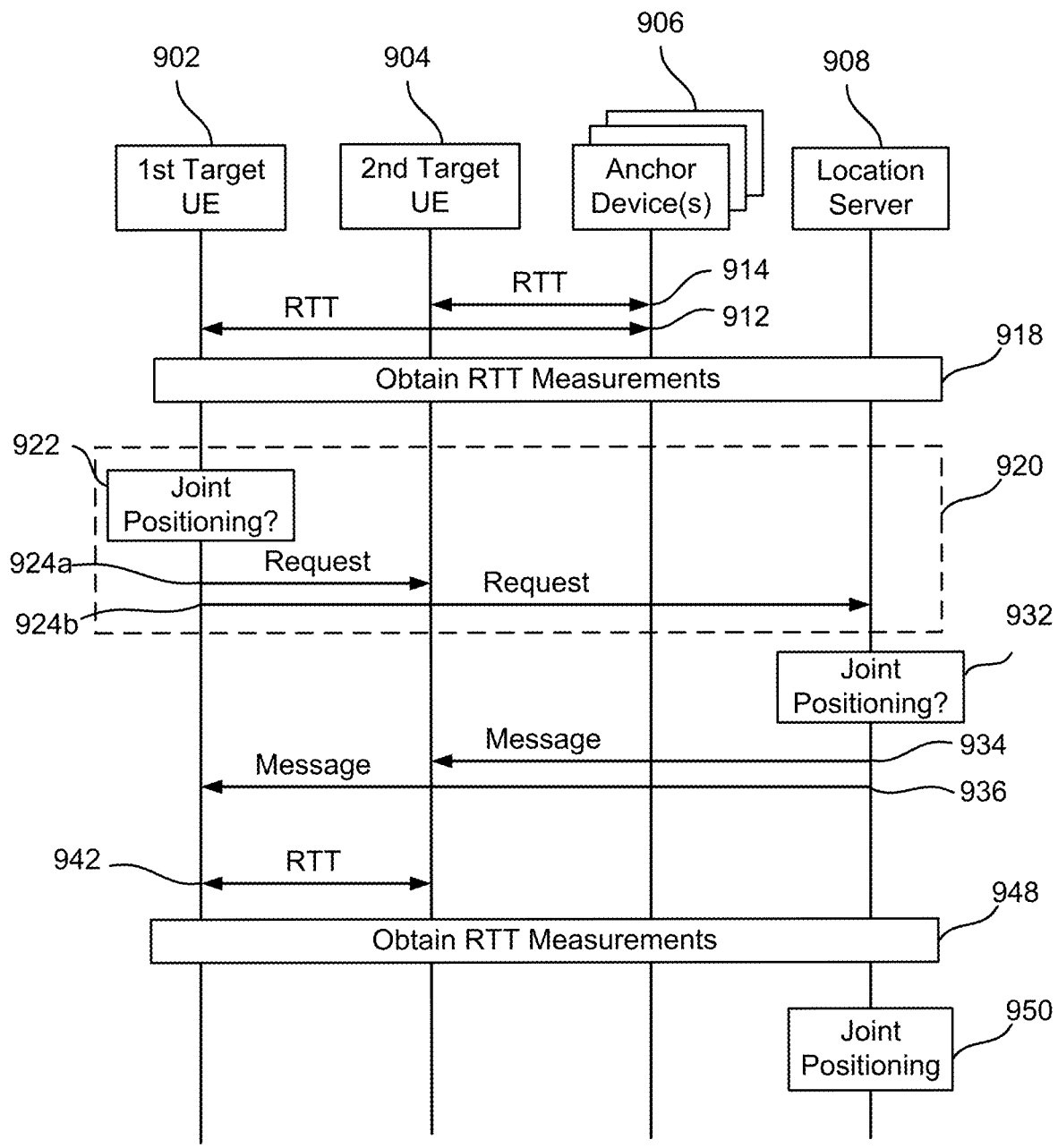
FIG. 9 illustrates an example UE-assisted positioning procedure, according to aspects of the disclosure.

FIG. 9 illustrates an example UE-assisted positioning procedure based on a joint positioning procedure, according to aspects of the disclosure. FIG. 9 illustrates example interactions among a first target UE 902, a second target UE 904, one or more anchor devices 906, and a location server 908. In some aspects, the first target UE 902 and the second target UE 904 may correspond to any UE described in this disclosure. In some aspects, each one of the one or more anchor devices 906 may correspond to any RSU, UE, or TRP described in this disclosure. In some aspects, the location server 908 may correspond to the location server 172, the location server 230, the LMF 270, the SLP 272, or any device that may be configured as a location server. In some aspects, the first target UE 902 may correspond to the target UE 812, and the second target UE 904 may correspond to the target UE 816. In some aspects, the one or more anchor devices 906 may correspond to the anchor devices 822, 824, and 826.

In FIG. 9, the first target UE 902 and the second target UE 904 are merely introduced for illustration purposes. In some aspects, the operations described with reference to FIG. 9 for the first target UE 902 may be applicable to the second target UE 904, and vice versa. In some aspects, various stages in FIG. 9 may be arranged in an order different from the order depicted in FIG. 9.

In some aspects, the RTT operations or the RTT measurements described in FIG. 9 may be modified and/or replaced based on other applicable positioning or ranging operations or measurements, such as ToA measurements or the like.

At stage 912, the first target UE 902 may engage in one or more RTT operations between the first target UE 902 and first one or more anchor devices (e.g., at least a portion of the one or more anchor devices 906). At stage 914, the second target UE 904 may engage in one or more RTT operations between the second target UE 904 and second one or more anchor devices (e.g., at least a portion of the one or more anchor devices 906). In some aspects, the first one or more anchor devices and the second one or more anchor devices may include one or more common anchor devices belong to both groups. In some aspects, the first one or more anchor devices and the second one or more anchor devices may be identical. In some aspects, the first one or more anchor devices and the second one or more anchor devices may include completely different anchor devices.

In some aspects, the one or more RTT operations between the first target UE 902 and the first one or more anchor devices and the one or more RTT operations between the second target UE 904 and the second one or more anchor devices may include an operation based on PRS exchange, such as the example described with reference to FIG. 6. In some aspects, the one or more RTT operations between the first target UE 902 and the first one or more anchor devices and the one or more RTT operations between the second target UE 904 and the second one or more anchor devices may include an operation based on one-way propagation (e.g., half of a corresponding RTT measurement).

At stage 918, the location server 908 may obtain first one or more anchor-to-target RTT measurements corresponding to the one or more respective RTT operations between the first target UE 902 and the first one or more anchor devices, and obtain second one or more anchor-to-target RTT measurements corresponding to the one or more respective RTT operations between the second target UE 904 and the second one or more anchor devices.

In some aspects, the one or more anchor devices 906 (e.g., one or more RSUs) may determine the first one or more anchor-to-target RTT measurements and/or the second one or more anchor-to-target RTT measurements, and report the anchor-to-target RTT measurements to the location server 908. In some aspects, the first target UE 902 may determine the first one or more anchor-to-target RTT measurements. The first target UE 902 may report the first one or more anchor-to-target RTT measurements to the location server 908, or report these RTT measurements to one of the one or more anchor devices 906, which may further forward these RTT measurements to the location server 908. In some aspects, the second target UE 904 may determine the second one or more anchor-to-target RTT measurements. The second target UE 904 may report the second one or more anchor-to-target RTT measurements to the location server 908, or report these RTT measurements to one of the one or more anchor devices 906, which may further forward these RTT measurements to the location server 908.

In some aspects, as illustrated with reference to a dotted block 920, the first target UE 902 may initiate the joint positioning procedure by requesting for the joint positioning procedure. For example, at stage 922, the first target UE 902 may discover one or more other target UEs (e.g., the second target UE 904) and may determine that the joint positioning procedure using the combination of the anchor-to-target RTT measurements and the target-to-target RTT measurements may be performed. In some aspects, the first target UE 902 may request for target-to-target RTT measurements with the second target UE 904 based on the joint positioning procedure is supported by the location server 908 (or other device in the system). In some aspects, whether the location server 908 (or the system) supports the joint positioning procedure may be determined based on an announcement or indication of the capability provided by the location server 908, included in the pre-configuration applied to the first target UE 902, included the sidelink PRS resource pool configuration, or any combination thereof.

At stage 924*a*, the first target UE 902 may send a request for the target-to-target RTT measurements with the other target UEs to the other target UEs (e.g., the second target UE 904). In addition or alternative to stage 924*a*, at stage 924*b*, the first target UE 902 may send a request for the joint positioning procedure to the location server 908, or a request requesting performing the RTT operation between the first target UE 902 and the second target UE 904 to the location server 908. In some aspects, the location server 908 may grant the request from stage 924*b* and instruct the target UEs 902 and 904 to perform one or more RTT operations between the target UEs.

In some aspects, the location server 908 may initiate the joint positioning procedure. For example, at stage 932, the location server 908 may determine that the joint positioning procedure using the combination of the anchor-to-target RTT measurements and the target-to-target RTT measurements may be performed. In some aspects, the location server 908 may determine whether the target-to-target RTT measurement (corresponding to e.g., an RTT operation between the first target UE 902 and the second target UE 904) is to be used for determination of an estimated position of the first target UE 902. In some aspects, whether the target-to-target RTT measurement is to be used may be based on an industrial standard, a server-specific implementation, or a combination thereof.

In some aspects, the target-to-target RTT measurement may be determined to be used for the determination of the estimated position of the first target UE 902 based on: a number of available anchor devices to the first target UE 902 being less than a first threshold, a number of available anchor devices to the second target UE 904 being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement (if already available) being less than a fifth threshold, a request from the first target UE 902 or the second target UE 904 (e.g., the request from stage 924*b*) requesting performing the RTT operation between the first target UE 902 and the second target UE 904, or a combination thereof.

In some aspects, the number of common anchor devices belonging to both the first one or more anchor devices and the second one or more anchor devices may indicate or imply whether the first target UE 902 and the second target UE 904 are sufficiently close to each other. In some aspects, it may be assumed that, when two target UEs are sufficiently close to each other, it is likely that the two target UEs have an LOS condition and the equations based on the joint positioning procedure may be simplified by considering only the LOS condition.

At stage 934 and stage 936, after the location server 908 determines that the joint positioning procedure using the combination of the anchor-to-target RTT measurements and the target-to-target RTT measurement is to be performed, or after the location server 908 granting the request from the target UE at stage 924*b*, the location server 908 may send one or more messages to the first target UE 902, the second target UE 904, or both. In some aspects, the one or more messages may configure the first target UE 902 and the second target UE 904 to perform the RTT operation between the first target UE 902 and the second target UE 904. In some aspects, the location server 908 may also configure a base station to send configuration information to the first target UE 902 or the second target UE 904, where the configuration information may indicate a radio resource allocation for the RTT operation between the first target UE 902 and the second target UE 904.

At stage 942, the first target UE 902 and the second target UE 904 may engage in an RTT operation for obtaining a corresponding target-to-target RTT measurement based on the decision at stage 922, the request at stage 924*a*, the request at stage 924*b*, a grant or instruction included in a message at stage 934 or 936, or a combination thereof. In some aspects, the RTT operation between the first target UE 902 and the second target UE 904 may be performed based on exchanging position reference signals, such as the example described with reference to FIG. 6.

At stage 948, the location server 908 may obtain the target-to-target RTT measurement corresponding to the RTT operation between the first target UE 902 and the second target UE 904. In some aspects, the first target device 902 or the second target device 904 may report the target-to-target RTT measurement to the location server 908. In some aspects, the first target device 902 or the second target device 904 may report the target-to-target RTT measurement to one of the one or more anchor devices 906, which may forward the target-to-target RTT measurement to the location server 908.

At stage 950, the location server 908 may perform the positioning computation based on the joint positioning procedure to determine at least the estimated position of the first target UE 902 based on the first one or more anchor-to-target RTT measurements, the second one or more anchor-to-target RTT measurements, and the target-to-target RTT measurement. In some aspects, at stage 950, the location server 908 may also determine an estimated position of the second target UE 904 based on the first one or more anchor-to-target RTT measurements, the second one or more anchor-to-target RTT measurements, and the target-to-target RTT measurement.

In some aspects, one or more of the requests and/or the messages described with reference to FIG. 9 between the first target UE 902, the second target UE 904, the one or more anchor devices 906, and/or the location server 908 may be implemented based on a MAC layer (e.g., MAC Control Element (MAC CE)), RRC layer, V2X layer, or application layer message.

Figure 10:
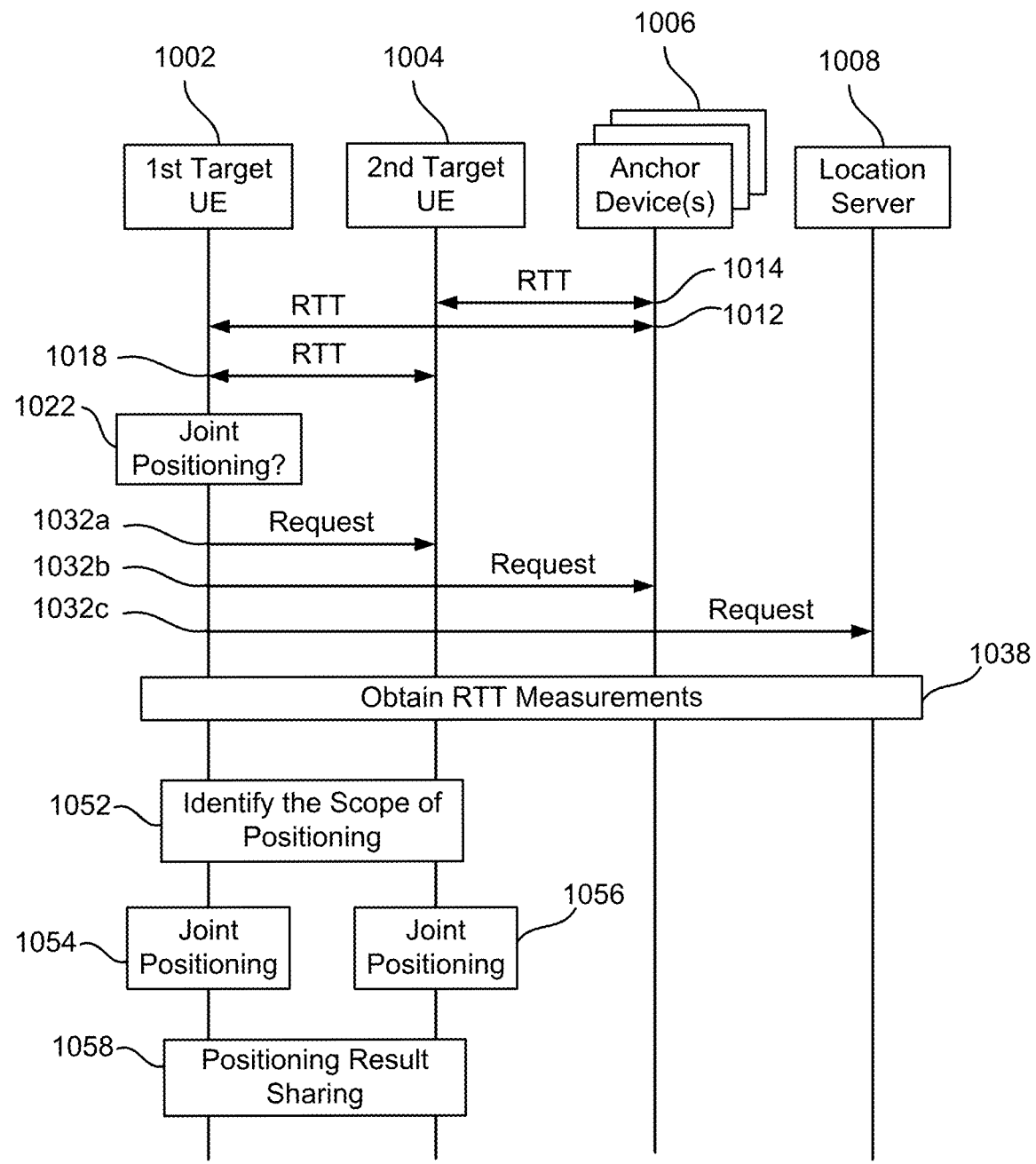
FIG. 10 illustrates an example UE-based positioning procedure, according to aspects of the disclosure.

FIG. 10 illustrates an example UE-based positioning procedure based on a joint positioning procedure, according to aspects of the disclosure. FIG. 10 illustrates example interactions among a first target UE 1002, a second target UE 1004, one or more anchor devices 1006, and a location server 1008. In some aspects, the first target UE 1002 and the second target UE 1004 may correspond to any UE described in this disclosure. In some aspects, each one of the one or more anchor devices 1006 may correspond to any RSU, UE, or TRP described in this disclosure. In some aspects, the location server 1008 may correspond to the location server 172, the location server 230, the LMF 270, the SLP 272, or any device that may be configured as a location server. In some aspects, the first target UE 1002 may correspond to the target UE 812, and the second target UE 1004 may correspond to the target UE 816. In some aspects, the one or more anchor devices 1006 may correspond to the anchor devices 822, 824, and 826.

In FIG. 10, the first target UE 1002 and the second target UE 1004 are merely introduced for illustration purposes. In some aspects, the operations described with reference to FIG. 10 for the first target UE 1002 may be applicable to the second target UE 1004, and vice versa. In some aspects, various stages in FIG. 10 may be arranged in an order different from the order depicted in FIG. 10.

In some aspects, the RTT operations or the RTT measurements described in FIG. 10 may be modified and/or replaced based on other applicable positioning or ranging operations or measurements, such as ToA measurements or the like.

At stage 1012, the first target UE 1002 may engage in one or more RTT operations between the first target UE 1002 and first one or more anchor devices (e.g., at least a portion of the one or more anchor devices 1006). At stage 1014, the second target UE 1004 may engage in one or more RTT operations between the second target UE 1004 and second one or more anchor devices (e.g., at least a portion of the one or more anchor devices 1006). In some aspects, the first one or more anchor devices and the second one or more anchor devices may include one or more common anchor devices belong to both groups. In some aspects, the first one or more anchor devices and the second one or more anchor devices may be identical. In some aspects, the first one or more anchor devices and the second one or more anchor devices may include completely different anchor devices.

In some aspects, the one or more RTT operations between the first target UE 1002 and the first one or more anchor devices and the one or more RTT operations between the second target UE 1004 and the second one or more anchor devices may include an operation based on PRS exchange, such as the example described with reference to FIG. 6. In some aspects, the one or more RTT operations between the first target UE 1002 and the first one or more anchor devices and the one or more RTT operations between the second target UE 1004 and the second one or more anchor devices may include an operation based on one-way propagation (e.g., half of a corresponding RTT measurement).

At stage 1018, the first target UE 1002 may discover one or more other target UEs (e.g., the second target UE 1004) and engage in one or more RTT operations between the first target UE 1002 and the one or more other target UEs (e.g., the second target UE 1004). In some aspects, the RTT operation between the first target UE 1002 and the second target UE 1004 may be performed based on exchanging position reference signals, such as the example described with reference to FIG. 6. In some aspects, the first target UE 1002 may perform the one or more RTT operations with the one or more other target UEs after sending corresponding requests and obtaining respective grants or acknowledgements.

In some aspects, such request may be sent to the one or more other target UEs, to the location server 1008 and then forwarded to the one or more other target UEs, or to at least one of the one or more anchor devices 1006 and then forwarded to the one or more other target UEs. In some aspects, the first target UE 1002 may send a request to the second target UE, a server device (e.g., the location server 1008), or one of the first one or more anchor devices or one of the second one or more anchor devices, where the request requests for a grant to perform the RTT operation between the first target UE 1002 and the second target UE 1004. The first target UE 1002 and/or the second target UE 1004 may engage in the RTT operation between the first target UE 1002 and the second target UE 1004 based on receiving a grant in response to the sent request for grant.

In some aspects, the first target UE 1002 may perform the RTT operation between the first target UE 1002 and the second target UE 1004 based on discovering the second target UE 1004 (e.g., without obtaining any grant or instruction from the location server 1008).

At stage 1022, the first target UE 1002 may determine that the estimated position of the first target UE 1002 may be determined based on the joint positioning procedure, where the joint positioning procedure may be performed based on at least first one or more anchor-to-target RTT measurements corresponding to the one or more respective RTT operations between the first target UE 1002 and the first one or more anchor devices and one or more target-to-target RTT measurements between the target UE 1002 and the one or more other target UEs (e.g., the second target UE 1004).

In some aspects, at stage 1022, the first target UE 1002 may further determine whether the anchor-to-target RTT measurements corresponding to respective RTT operations between the one or more other target UEs and the corresponding anchor devices (e.g., second one or more anchor-to-target RTT measurements corresponding to the one or more respective RTT operations between the second target UE 1004 and the second one or more anchor devices) may be used for determination of the estimated position of the first target UE 1002. In some aspects, the second one or more anchor-to-target RTT measurements are determined to be used for the determination of the estimated position of the first target UE 1002 based on the factors including a number of common anchor devices belonging to both the first one or more anchor devices and the second one or more anchor devices being greater than a first threshold, an estimated distance between the first target UE 1002 and the second target UE 1004 being less than a second threshold, the target-to-target RTT measurement being less than a third threshold, or a combination thereof. In some aspects, stage 1022 may be arranged before stage 1018.

After the first target UE 1002 determines that the second one or more anchor-to-target RTT measurements are to be used for the determination of the estimated position of the first target UE 1002, the first target UE 1002 may send a request requesting for the second one or more anchor-to-target RTT measurements. In some aspects, the first target UE 1002 may send the request to the first target UE 1002, the location server 1008, or the second one or more anchor devices to request for the second one or more anchor-to-target RTT measurements.

According to a first example, at stage 1032a, the first target UE 1002 may send a first request to the second target UE 1004, where the first request requests the second target UE 1004 to transmit the second one or more anchor-to-target RTT measurements in response to the first request. According to a second example, at stage 1032b, the first target UE 1002 may send one or more second requests to the second one or more anchor devices (included in the one or more anchor devices 1006), where the one or more second requests request the second one or more anchor devices to transmit the second one or more anchor-to-target RTT measurements in response to the one or more second requests. According to a third example, at stage 1032c, the first target UE 1002 may send a third request to a server device (e.g., the location server 1008), where the third request requests the server device to transmit the second one or more anchor-to-target RTT measurements and/or the first one or more anchor-to-target RTT measurements in response to the third request.

At stage 1038, the first target UE 1002 may obtain the first one or more anchor-to-target RTT measurements corresponding to the one or more respective RTT operations between the first target UE 1002 and the first one or more anchor devices, and obtain the second one or more anchor-to-target RTT measurements corresponding to the one or more respective RTT operations between the second target UE 1004 and the second one or more anchor devices.

With respect to obtaining the first one or more anchor-to-target RTT measurements, in some aspects, the first one or more anchor devices may determine the first one or more anchor-to-target RTT measurements and report the first anchor-to-target RTT measurements to the first target UE 1002. In some aspects, the first target UE 1002 may send a request to the location server 1008 (e.g., at stage 1032*c*), and the location server 1008 may collect the first one or more anchor-to-target RTT measurements from the first one or more anchor devices and forward the first one or more anchor-to-target RTT measurements to the first target UE 1002. In some aspects, the first target UE 1002 may determine the first one or more anchor-to-target RTT measurements, and obtain the first anchor-to-target RTT measurements from a memory or a processor of the first target UE 1002 that holds the first one or more anchor-to-target RTT measurements.

With respect to obtaining the second one or more anchor-to-target RTT measurements, according to the first example where a first request is sent to the second target UE (at stage 1032*a*), the second target UE 1004 may transmit the second one or more anchor-to-target RTT measurements to the first target UE 1002 in response to the first request. In some aspects, the second target UE 1004 may forward all available anchor-to-target RTT measurements concerning the second target UE 1004 to the first target UE 1002 as the second one or more anchor-to-target RTT measurements. In some aspects, the first request may indicate a certain number of anchor-to-target RTT measurements, and the second target UE 1004 may forward at most the indicated number of anchor-to-target RTT measurements concerning the second target UE 1004 to the first target UE 1002 as the second one or more anchor-to-target RTT measurements. In some aspects, the first request may include anchor device identifiers identifying certain anchor devices as the second one or more anchor devices, and the second target UE 1004 may forward the anchor-to-target RTT measurements concerning the second target UE 1004 and the identified anchor devices to the first target UE 1002 as the second one or more anchor-to-target RTT measurements. In some aspects, the first target UE 1002 may receive, from the second target UE 1004, the second one or more anchor-to-target RTT measurements provided together with anchor device identifiers identifying the corresponding anchor devices used as the second one or more anchor devices.

In some aspects, at stage 1038 according to the second example where one or more second requests are sent to the second one or more anchor devices (at stage 1032*b*), the second one or more anchor devices may send the second one or more anchor-to-target RTT measurements to the first target UE 1002, or may send the second one or more anchor-to-target RTT measurements to the second target UE 1004 and let the second target UE 1004 forward the second one or more anchor-to-target RTT measurements to the first target UE 1002. In some aspects, at stage 1038 according to the third example where a third request is sent to the location server 1008 (at stage 1032*c*), the location server 1008 may collect the second one or more anchor-to-target RTT measurements from the second one or more anchor devices or the second target UE 1004, and then forward the second one or more anchor-to-target RTT measurements to the first target UE 1002.

At stage 1052, the first target UE 1002 and the one or more other target UEs, such as the second target UE 1004, may negotiate and identify the scope of positioning to be performed by the first target UE 1002. In some aspects, based on the first one or more anchor-to-target RTT measurements, the second one or more anchor-to-target RTT measurements, and the target-to-target RTT measurement, the first target UE 1002 may be able to determine not only the estimated position of the first target UE 1002 but also the estimated position of the second target UE 1004.

In some aspects, the first target UE 1002 may communicate with the second target UE 1004 to assign the first target UE 1002, the second target UE 1004, or both, to determine the estimated position of the first target UE 1002 and/or the estimated position of the second target UE 1004 based on the first one or more anchor-to-target RTT measurements, the second one or more anchor-to-target RTT measurements, and the target-to-target RTT measurement. In some aspects, the first target UE 1002 may communicate with the second target UE 1004 and determine that the first target UE 1002 is not responsible for determining the estimated position of the second target UE 1004, even such information may be derivable from or even available in the intermediate data during the computation of the estimated position of the first target UE 1002 based on the joint positioning procedure.

In some aspects, whether the first target UE 1002 is to determine the estimated position of the second target UE 1004 may be determined based on the negotiation (e.g., a decision making process based on one or more predetermined rules) between the first target UE 1002 and the second target UE 1004. In some aspects, the scope of the positioning procedure may be pre-configured or pre-defined based on an industrial standard or a vendor's implementation, and stage 1052 may be performed without the negotiation between the first target UE 1002 and the second target UE 1004.

At stage 1054, the first target UE 1002 may perform joint positioning computation to determine the estimated position of the first target UE 1002 based on the first one or more anchor-to-target RTT measurements, the second one or more anchor-to-target RTT measurements, and the target-to-target RTT measurement. In some aspects, at stage 1054, based on the decision of stage 1052, the first target UE 1002 may also determine the estimated position of the second target UE 1004 based on the first one or more anchor-to-target RTT measurements, the second one or more anchor-to-target RTT measurements, and the target-to-target RTT measurement.

Similarly, at stage 1056 based on the decision of stage 1052, the second target UE 1004 may perform joint positioning computation to determine the estimated position of the second target UE 1004 and/or the estimated position of the first target UE 1002 based on the first one or more anchor-to-target RTT measurements, the second one or more anchor-to-target RTT measurements, and the target-to-target RTT measurement.

At stage 1058, the first target UE 1002 and the second target UE 1004 may share the positioning results from stage 1054 and stage 1056. In some aspects, based on the first target UE 1002 being tasked with determining the estimated position of the second target UE 1004, the first target UE 1002 may provide the estimated position of the second target UE 1004 from stage 1054 to the second target UE 1004. In some aspects, regardless of the first target UE 1002 being tasked with determining the estimated position of the second target UE 1004 or not, the first target UE 1002 may provide the estimated position of the first target UE 1002 and/or the intermediate data from stage 1054 to the second target UE 1004. In some aspects, the second target UE 1004 may use the estimated position of the first target UE 1002 and/or the intermediate data from stage 1054 to determine or refine the estimated position of the second target UE 1004.

Similarly, in some aspects, based on the second target UE 1004 being tasked with determining the estimated position of the first target UE 1002, the first target UE 1002 may receive the estimated position of the first target UE 1002 from stage 1056 from the second target UE 1004. In some aspects, regardless of the second target UE 1004 being tasked with determining the estimated position of the first target UE 1002 or not, the first target UE 1002 may receive the estimated position of the second target UE 1004 and/or the intermediate data from stage 1056 from the second target UE 1004. In some aspects, the first target UE 1002 may use the estimated position of the second target UE 1004 and/or the intermediate data from stage 1056 to determine or refine the estimated position of the first target UE 1002.

In some aspects, one or more of the requests and/or the messages described with reference to FIG. 10 between the first target UE 1002, the second target UE 1004, the one or more anchor devices 1006, and/or the location server 1008 may be implemented based on a MAC layer (e.g., MAC CE), RRC layer, V2X layer, or application layer message.

Figure 11:
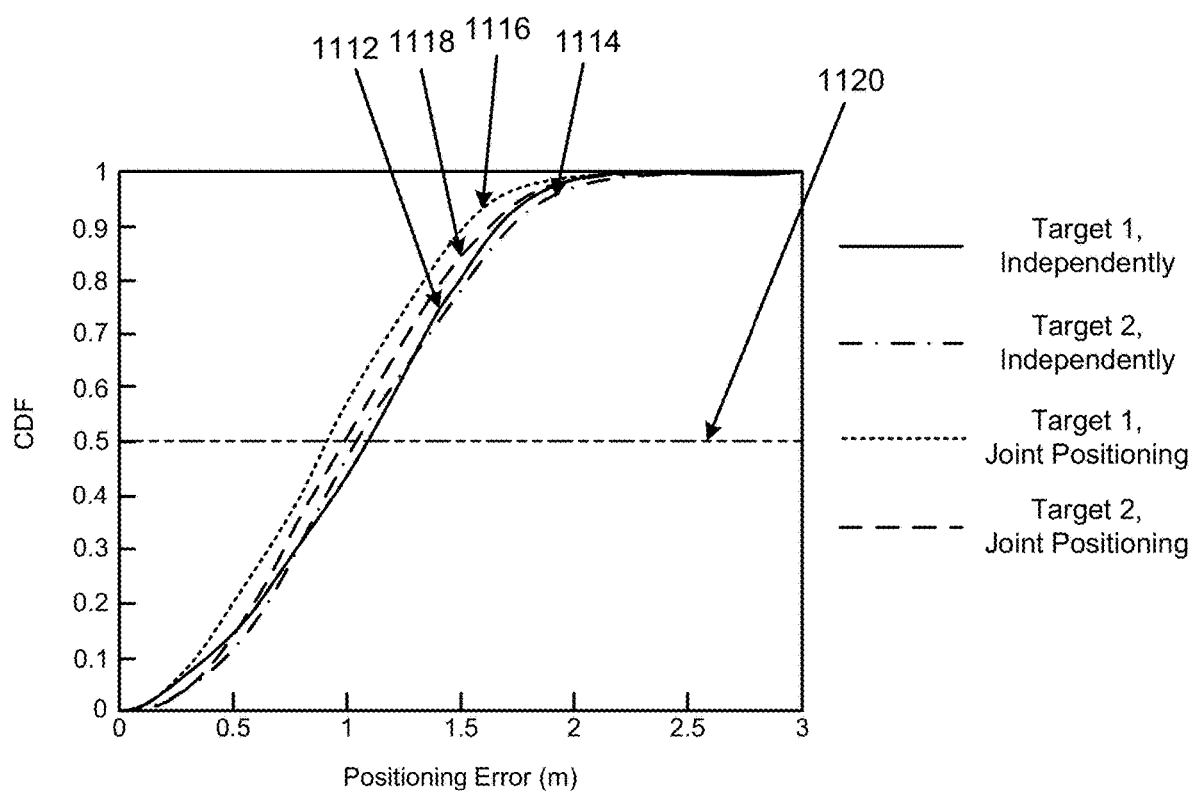
FIG. 11 illustrates simulated positioning errors of positioning procedures performed based on an experimental setting, according to aspects of the disclosure.

FIG. 11 illustrates simulated positioning errors of positioning procedures performed based on an experimental setting, according to aspects of the disclosure. In the experimental setting, three anchor devices (e.g., the anchor devices 822, 824, and 826) are arranged such that the positions of the three anchor devices form an equilateral triangle area with each side having a side length of about 500 m. In the experimental setting, two target UEs (e.g., Target 1 and Target 2, which may correspond to the target UEs 812 and 816) are placed within the equilateral triangle area.

As shown in FIG. 11, the horizontal axis represents position errors in meters, and the vertical axis represents CDF of position errors. Curve 1112 represents the simulation result of positioning Target 1 independently (i.e., without the joint positioning procedure); curve 1114 represents the simulation result of positioning Target 2 independently (i.e., without the joint positioning procedure); curve 1116 represents the simulation result of positioning Target 1 based on the joint positioning procedure; and curve 1118 represents the simulation result of positioning Target 2 based on the joint positioning procedure.

As shown in FIG. 11, given a certain accuracy probability, such as at 0.5 as indicated by a reference line 1120, the joint positioning procedure provides about 16% reduction in positioning error for Target 1 and about 8% reduction in positioning error for Target 2.

Figure 12:
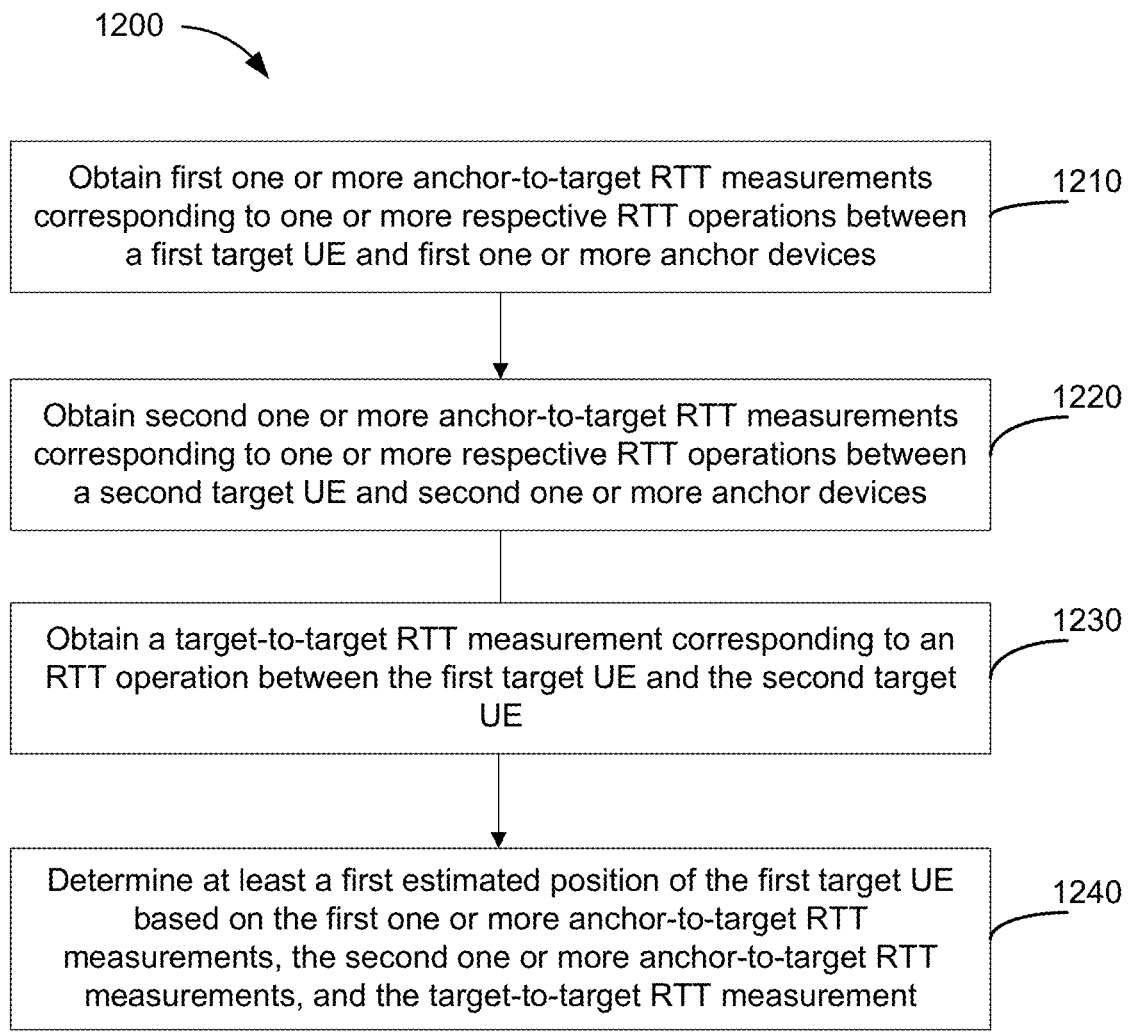
FIG. 12 illustrates an example method of operating a device, according to aspects of the disclosure.

FIG. 12 illustrates an example method 1200 of operating a device, such as a UE or a location server, for a position estimation procedure based on one or more anchor-to-target RTT measurements and one or more target-to-target RTT measurements, according to aspects of the disclosure.

In some aspects, method 1200 may be performed by a target UE (e.g., any of the UE described herein). In some aspects, method 1200 may correspond to the operations performed by the first target UE 902 or 1002. In an aspect, method 1200 may be performed by the one or more WWAN transceivers 310, the one or more processors 332, memory 340, and/or positioning component 342, any or all of which may be considered means for performing one or more of the following operations of method 1200.

In some aspects, method 1200 may be performed by a server device (e.g., any of the location server, LMF, SLP, or server described herein). In some aspects, method 1200 may correspond to the operations performed by the location server 908 or 1008. In an aspect, method 1200 may be performed by the one or more network transceivers 398, the one or more processors 394, memory 398, and/or positioning component 398, any or all of which may be considered means for performing one or more of the following operations of method 1200.

At operation 1210, the device obtains first one or more anchor-to-target RTT measurements corresponding to one or more respective RTT operations between a first target UE and first one or more anchor devices. In some aspects, the one or more RTT operations between the first target UE and the first one or more anchor devices may include an operation based on PRS exchange, such as the example described with reference to FIG. 6. In some aspects, the first target UE may correspond to the first target UE 902 or the first target UE 1002.

In some aspects, the device may be a location server (such as the location server 908). In some aspects, the device may be the first target UE (such as the first target UE 1002).

In some aspects, the location server may be configured as the device, and the location server may obtain the first one or more anchor-to-target RTT measurements from the first target UE or from the first one or more anchor devices. In some aspects, the first target UE may be configured as the device, and the first target UE may obtain the first one or more anchor-to-target RTT measurements from the first target UE itself, from the first one or more anchor devices, or from the location server that collects the anchor-to-target RTT measurements.

In some aspects, operation 1210 may be performed by the one or more network transceivers 390, the one or more processors 394, memory 396, and/or positioning component 398, any or all of which may be considered means for performing operation 1210. In some aspects, operation 1210 may be performed by the one or more WWAN transceivers 310, the one or more processors 332, memory 340, and/or positioning component 342, any or all of which may be considered means for performing operation 1210.

At operation 1220, the device obtains second one or more anchor-to-target RTT measurements corresponding to one or more respective RTT operations between a second target UE and second one or more anchor devices. In some aspects, the one or more RTT operations between the second target UE and the second one or more anchor devices may include an operation based on PRS exchange, such as the example described with reference to FIG. 6. In some aspects, the second target UE may correspond to the second target UE 904 or the second target UE 1004.

In some aspects, the location server may be configured as the device, and the location server may obtain the second one or more anchor-to-target RTT measurements from the second target UE or from the second one or more anchor devices. In some aspects, the first target UE may be configured as the device, and the first target UE may obtain the second one or more anchor-to-target RTT measurements from the second target UE, from the second one or more anchor devices, or from the location server that collects the anchor-to-target RTT measurements.

In some aspects, operation 1220 may be performed by the one or more network transceivers 390, the one or more processors 394, memory 396, and/or positioning component 398, any or all of which may be considered means for performing operation 1220. In some aspects, operation 1220 may be performed by the one or more WWAN transceivers 310, the one or more processors 332, memory 340, and/or positioning component 342, any or all of which may be considered means for performing operation 1220.

At operation 1230, the device obtains a target-to-target RTT measurement corresponding to an RTT operation between the first target UE and the second target UE. In some aspects, the RTT operations between the first target UE and the second target UE may include an operation based on PRS exchange, such as the example described with reference to FIG. 6.

In some aspects, the location server may be configured as the device, and the location server may obtain the target-to-target RTT measurement from the first target UE, from the second target UE, or from an anchor device that collects the target-to-target RTT measurement. In some aspects, the first target UE may be configured as the device, and the first target UE may obtain the target-to-target RTT measurement from the first target UE itself, from the second target UE, from an anchor device that collects the target-to-target RTT measurement, or from the location server that collects the target-to-target RTT measurements.

In some aspects, operation 1230 may be performed by the one or more network transceivers 390, the one or more processors 394, memory 396, and/or positioning component 398, any or all of which may be considered means for performing operation 1230. In some aspects, operation 1230 may be performed by the one or more WWAN transceivers 310, the one or more processors 332, memory 340, and/or positioning component 342, any or all of which may be considered means for performing operation 1230.

In some aspects, the signaling, including various requests or messages, between the first target UE, the second target UE, the first one or more anchor devices, the second one or more anchor devices, and/or the location server may be implemented based on a MAC layer (e.g., MAC CE), RRC layer, V2X layer, or application layer message.

At operation 1240, the device determines at least a first estimated position of the first target UE based on the first one or more anchor-to-target RTT measurements, the second one or more anchor-to-target RTT measurements, and the target-to-target RTT measurement. In some aspects, the device may further determine a second estimated position of the second target UE based on the first one or more anchor-to-target RTT measurements, the second one or more anchor-to-target RTT measurements, and the target-to-target RTT measurement.

In some aspects, operation 1240 may be performed by the one or more network transceivers 390, the one or more processors 394, memory 396, and/or positioning component 398, any or all of which may be considered means for performing operation 1240. In some aspects, operation 1240 may be performed by the one or more WWAN transceivers 310, the one or more processors 332, memory 340, and/or positioning component 342, any or all of which may be considered means for performing operation 1240.

As will be appreciated, a technical advantage of the method 1200 is directed to estimation of positions of multiple target UEs based on a joint positioning procedure, where either a target UE or a location server may initiate the joint positioning procedure. Based on the joint positioning procedure, the anchor-to-target RTT measurements of the target UEs and the corresponding equations for the positioning procedure of the target UEs may be linked by one or more target-to-target RTT measurements between the target UEs. Accordingly, the positioning accuracy may be improved by the added information from the one or more target-to-target RTT measurements between the target UEs and the cross-reference of the anchor-to-target RTT measurements, even though the number of anchors may not have been increased In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a device, comprising: obtaining first one or more anchor-to-target round-trip time (RTT) measurements corresponding to one or more respective RTT operations between a first target user equipment (UE) and first one or more anchor devices; obtaining second one or more anchor-to-target RTT measurements corresponding to one or more respective RTT operations between a second target UE and second one or more anchor devices; obtaining a target-to-target RTT measurement corresponding to an RTT operation between the first target UE and the second target UE; and determining at least a first estimated position of the first target UE based on the first one or more anchor-to-target RTT measurements, the second one or more anchor-to-target RTT measurements, and the target-to-target RTT measurement.

Clause 2. The method of clause 1, further comprising: determining a second estimated position of the second target UE based on the first one or more anchor-to-target RTT measurements, the second one or more anchor-to-target RTT measurements, and the target-to-target RTT measurement.

Clause 3. The method of any of clauses 1 to 2, further comprising determining whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

Clause 4. The method of clause 3, wherein the target-to-target RTT measurement is determined to be used for the determination of the first estimated position of the first target UE based on: a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

Clause 5. The method of any of clauses 1 to 4, wherein: the device is a server device, and the method further comprises: sending one or more messages to the first target UE, the second target UE, or both, the one or more messages configuring the first target UE and the second target UE to perform the RTT operation between the first target UE and the second target UE; and receiving the target-to-target RTT measurement directly from the first target UE or the second target UE, or indirectly from the first target UE or the second target UE via one of the first one or more anchor devices or one of the second one or more anchor devices.

Clause 6. The method of any of clauses 1 to 4, wherein: the device is a server device, and the method further comprises: configuring a base station to send configuration information to the first target UE or the second target UE, the configuration information indicating a radio resource allocation for the RTT operation between the first target UE and the second target UE.

Clause 7. The method of any of clauses 1 to 4, wherein: the device is the first target UE, and the method further comprises: sending a first request to the second target UE, wherein the first request requests the second target UE to transmit the second one or more anchor-to-target RTT measurements in response to the first request; sending one or more second requests to the second one or more anchor devices, wherein the one or more second requests request the second one or more anchor devices to transmit the second one or more anchor-to-target RTT measurements in response to the one or more second requests; or sending a third request to a server device, wherein the third request requests the server device to transmit the second one or more anchor-to-target RTT measurements in response to the second request.

Clause 8. The method of clause 7, further comprising: communicating with the second target UE to assign the first target UE, the second target UE, or both, to determine a second estimated position of the second target UE based on the first one or more anchor-to-target RTT measurements, the second one or more anchor-to-target RTT measurements, and the target-to-target RTT measurement.

Clause 9. The method of any of clauses 7 to 8, further comprising: determining a second estimated position of the second target UE based on the first one or more anchor-to-target RTT measurements, the second one or more anchor-to-target RTT measurements, and the target-to-target RTT measurement; and sending location information indicating the second estimated position of the second target UE to the second target UE.

Clause 10. The method of any of clauses 7 to 9, wherein the first request includes anchor device identifiers identifying the second one or more anchor devices.

Clause 11. The method of any of clauses 7 to 10, further comprising: receiving, from the second target UE, the second one or more anchor-to-target RTT measurements together with anchor device identifiers identifying the second one or more anchor devices.

Clause 12. The method of any of clauses 7 to 11, further comprising determining whether the second one or more anchor-to-target RTT measurements are to be used for determination of the first estimated position of the first target UE, wherein the second one or more anchor-to-target RTT measurements are obtained based on the second one or more anchor-to-target RTT measurements being determined to be used for the determination of the first estimated position of the first target UE.

Clause 13. The method of clause 12, wherein the second one or more anchor-to-target RTT measurements are determined to be used for the determination of the first estimated position of the first target UE based on: a number of common anchor devices belonging to both the first one or more anchor devices and the second one or more anchor devices being greater than a first threshold, an estimated distance between the first target UE and the second target UE being less than a second threshold, the target-to-target RTT measurement being less than a third threshold, or a combination thereof.

Clause 14. The method of any of clauses 7 to 13, further comprising: performing the RTT operation between the first target UE and the second target UE based on discovering the second target UE.

Clause 15. The method of any of clauses 7 to 13, further comprising: sending a fourth request to the second target UE, a server device, or one of the first one or more anchor devices or one of the second one or more anchor devices, the fourth request requesting for a grant to perform the RTT operation between the first target UE and the second target UE.

Clause 16. The method of clause 15, wherein at least one of the first request, the one or more second requests, the third request, or the fourth request is implemented based on a Medium Access Control (MAC) layer, Radio Resource Control (RRC) layer, Vehicle-to-Everything (V2X) layer, or application layer message.

Clause 17. A device, comprising: a memory; and at least one processor communicatively coupled to the memory, the at least one processor configured to: obtain first one or more anchor-to-target round-trip time (RTT) measurements corresponding to one or more respective RTT operations between a first target user equipment (UE) and first one or more anchor devices; obtain second one or more anchor-to-target RTT measurements corresponding to one or more respective RTT operations between a second target UE and second one or more anchor devices; obtain a target-to-target RTT measurement corresponding to an RTT operation between the first target UE and the second target UE; and determine at least a first estimated position of the first target UE based on the first one or more anchor-to-target RTT measurements, the second one or more anchor-to-target RTT measurements, and the target-to-target RTT measurement.

Clause 18. The device of clause 17, wherein the at least one processor is further configured to: determine a second estimated position of the second target UE based on the first one or more anchor-to-target RTT measurements, the second one or more anchor-to-target RTT measurements, and the target-to-target RTT measurement.

Clause 19. The device of any of clauses 17 to 18, wherein the at least one processor is further configured to determine whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

Clause 20. The device of clause 19, wherein the target-to-target RTT measurement is determined to be used for the determination of the first estimated position of the first target UE based on: a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

Clause 21. The device of any of clauses 17 to 20, wherein: the device is a server device, and the at least one processor is further configured to: send one or more messages to the first target UE, the second target UE, or both, the one or more messages configuring the first target UE and the second target UE to perform the RTT operation between the first target UE and the second target UE; and receive the target-to-target RTT measurement directly from the first target UE or the second target UE, or indirectly from the first target UE or the second target UE via one of the first one or more anchor devices or one of the second one or more anchor devices.

Clause 22. The device of any of clauses 17 to 20, wherein: the device is a server device, and the at least one processor is further configured to: configure a base station to send configuration information to the first target UE or the second target UE, the configuration information indicating a radio resource allocation for the RTT operation between the first target UE and the second target UE.

Clause 23. The device of any of clauses 17 to 20, wherein: the device is the first target UE, and the at least one processor is further configured to: send a first request to the second target UE, wherein the first request requests the second target UE to transmit the second one or more anchor-to-target RTT measurements in response to the first request; send one or more second requests to the second one or more anchor devices, wherein the one or more second requests request the second one or more anchor devices to transmit the second one or more anchor-to-target RTT measurements in response to the one or more second requests; or send a third request to a server device, wherein the third request requests the server device to transmit the second one or more anchor-to-target RTT measurements in response to the second request.

Clause 24. The device of clause 23, wherein the at least one processor is further configured to: communicate with the second target UE to assign the first target UE, the second target UE, or both, to determine a second estimated position of the second target UE based on the first one or more anchor-to-target RTT measurements, the second one or more anchor-to-target RTT measurements, and the target-to-target RTT measurement.

Clause 25. The device of any of clauses 23 to 24, wherein the at least one processor is further configured to: determine a second estimated position of the second target UE based on the first one or more anchor-to-target RTT measurements, the second one or more anchor-to-target RTT measurements, and the target-to-target RTT measurement; and send location information indicating the second estimated position of the second target UE to the second target UE.

Clause 26. The device of any of clauses 23 to 25, wherein the first request includes anchor device identifiers identifying the second one or more anchor devices.

Clause 27. The device of any of clauses 23 to 26, wherein the at least one processor is further configured to: receive, from the second target UE, the second one or more anchor-to-target RTT measurements together with anchor device identifiers identifying the second one or more anchor devices.

Clause 28. The device of any of clauses 23 to 27, wherein the at least one processor is further configured to determine whether the second one or more anchor-to-target RTT measurements are to be used for determination of the first estimated position of the first target UE, wherein the second one or more anchor-to-target RTT measurements are obtained based on the second one or more anchor-to-target RTT measurements being determined to be used for the determination of the first estimated position of the first target UE.

Clause 29. The device of clause 28, wherein the second one or more anchor-to-target RTT measurements are determined to be used for the determination of the first estimated position of the first target UE based on: a number of common anchor devices belonging to both the first one or more anchor devices and the second one or more anchor devices being greater than a first threshold, an estimated distance between the first target UE and the second target UE being less than a second threshold, the target-to-target RTT measurement being less than a third threshold, or a combination thereof.

Clause 30. The device of any of clauses 23 to 29, wherein the at least one processor is further configured to: perform the RTT operation between the first target UE and the second target UE based on discovering the second target UE.

Clause 31. The device of any of clauses 23 to 29, wherein the at least one processor is further configured to: send a fourth request to the second target UE, a server device, or one of the first one or more anchor devices or one of the second one or more anchor devices, the fourth request requesting for a grant to perform the RTT operation between the first target UE and the second target UE.

Clause 32. The device of clause 31, wherein at least one of the first request, the one or more second requests, the third request, or the fourth request is implemented based on a Medium Access Control (MAC) layer, Radio Resource Control (RRC) layer, Vehicle-to-Everything (V2X) layer, or application layer message.

Clause 33. A device, comprising: means for obtaining first one or more anchor-to-target round-trip time (RTT) measurements corresponding to one or more respective RTT operations between a first target user equipment (UE) and first one or more anchor devices; means for obtaining second one or more anchor-to-target RTT measurements corresponding to one or more respective RTT operations between a second target UE and second one or more anchor devices; means for obtaining a target-to-target RTT measurement corresponding to an RTT operation between the first target UE and the second target UE; and means for determining at least a first estimated position of the first target UE based on the first one or more anchor-to-target RTT measurements, the second one or more anchor-to-target RTT measurements, and the target-to-target RTT measurement.

Clause 34. The device of clause 33, further comprising: means for determining a second estimated position of the second target UE based on the first one or more anchor-to-target RTT measurements, the second one or more anchor-to-target RTT measurements, and the target-to-target RTT measurement.

Clause 35. The device of any of clauses 33 to 34, further comprising means for determining whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

Clause 36. The device of clause 35, wherein the target-to-target RTT measurement is determined to be used for the determination of the first estimated position of the first target UE based on: a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

Clause 37. The device of any of clauses 33 to 36, wherein: the device is a server device, and the device further comprises: means for sending one or more messages to the first target UE, the second target UE, or both, the one or more messages configuring the first target UE and the second target UE to perform the RTT operation between the first target UE and the second target UE; and means for receiving the target-to-target RTT measurement directly from the first target UE or the second target UE, or indirectly from the first target UE or the second target UE via one of the first one or more anchor devices or one of the second one or more anchor devices.

Clause 38. The device of any of clauses 33 to 36, wherein: the device is a server device, and the device further comprises: means for configuring a base station to send configuration information to the first target UE or the second target UE, the configuration information indicating a radio resource allocation for the RTT operation between the first target UE and the second target UE.

Clause 39. The device of any of clauses 33 to 36, wherein: the device is the first target UE, and the device further comprises: means for sending a first request to the second target UE, wherein the first request requests the second target UE to transmit the second one or more anchor-to-target RTT measurements in response to the first request; means for sending one or more second requests to the second one or more anchor devices, wherein the one or more second requests request the second one or more anchor devices to transmit the second one or more anchor-to-target RTT measurements in response to the one or more second requests; or means for sending a third request to a server device, wherein the third request requests the server device to transmit the second one or more anchor-to-target RTT measurements in response to the second request.

Clause 40. The device of clause 39, further comprising: means for communicating with the second target UE to assign the first target UE, the second target UE, or both, to determine a second estimated position of the second target UE based on the first one or more anchor-to-target RTT measurements, the second one or more anchor-to-target RTT measurements, and the target-to-target RTT measurement.

Clause 41. The device of any of clauses 39 to 40, further comprising: means for determining a second estimated position of the second target UE based on the first one or more anchor-to-target RTT measurements, the second one or more anchor-to-target RTT measurements, and the target-to-target RTT measurement; and means for sending location information indicating the second estimated position of the second target UE to the second target UE.

Clause 42. The device of any of clauses 39 to 41, wherein the first request includes anchor device identifiers identifying the second one or more anchor devices.

Clause 43. The device of any of clauses 39 to 42, further comprising: means for receiving, from the second target UE, the second one or more anchor-to-target RTT measurements together with anchor device identifiers identifying the second one or more anchor devices.

Clause 44. The device of any of clauses 39 to 43, further comprising means for determining whether the second one or more anchor-to-target RTT measurements are to be used for determination of the first estimated position of the first target UE, wherein the second one or more anchor-to-target RTT measurements are obtained based on the second one or more anchor-to-target RTT measurements being determined to be used for the determination of the first estimated position of the first target UE.

Clause 45. The device of clause 44, wherein the second one or more anchor-to-target RTT measurements are determined to be used for the determination of the first estimated position of the first target UE based on: a number of common anchor devices belonging to both the first one or more anchor devices and the second one or more anchor devices being greater than a first threshold, an estimated distance between the first target UE and the second target UE being less than a second threshold, the target-to-target RTT measurement being less than a third threshold, or a combination thereof.

Clause 46. The device of any of clauses 39 to 45, further comprising: means for performing the RTT operation between the first target UE and the second target UE based on discovering the second target UE.

Clause 47. The device of any of clauses 39 to 45, further comprising: means for sending a fourth request to the second target UE, a server device, or one of the first one or more anchor devices or one of the second one or more anchor devices, the fourth request requesting for a grant to perform the RTT operation between the first target UE and the second target UE.

Clause 48. The device of clause 47, wherein at least one of the first request, the one or more second requests, the third request, or the fourth request is implemented based on a Medium Access Control (MAC) layer, Radio Resource Control (RRC) layer, Vehicle-to-Everything (V2X) layer, or application layer message.

Clause 49. A non-transitory computer-readable medium storing computer-executable instructions that, when executed by a device, cause the device to: obtain first one or more anchor-to-target round-trip time (RTT) measurements corresponding to one or more respective RTT operations between a first target user equipment (UE) and first one or more anchor devices; obtain second one or more anchor-to-target RTT measurements corresponding to one or more respective RTT operations between a second target UE and second one or more anchor devices; obtain a target-to-target RTT measurement corresponding to an RTT operation between the first target UE and the second target UE; and determine at least a first estimated position of the first target UE based on the first one or more anchor-to-target RTT measurements, the second one or more anchor-to-target RTT measurements, and the target-to-target RTT measurement.

Clause 50. The non-transitory computer-readable medium of clause 49, further comprising computer-executable instructions that, when executed by the device, cause the device to: determine a second estimated position of the second target UE based on the first one or more anchor-totarget RTT measurements, the second one or more anchor-to-target RTT measurements, and the target-to-target RTT measurement.

Clause 51. The non-transitory computer-readable medium of any of clauses 49 to 50, further comprising computer-executable instructions that, when executed by the device, cause the device to determine whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

Clause 52. The non-transitory computer-readable medium of clause 51, wherein the target-to-target RTT measurement is determined to be used for the determination of the first estimated position of the first target UE based on: a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

Clause 53. The non-transitory computer-readable medium of any of clauses 49 to 52, wherein: the device is a server device, and the non-transitory computer-readable medium further comprises computer-executable instructions that, when executed by the device, cause the device to: send one or more messages to the first target UE, the second target UE, or both, the one or more messages configuring the first target UE and the second target UE to perform the RTT operation between the first target UE and the second target UE; and receive the target-to-target RTT measurement directly from the first target UE or the second target UE, or indirectly from the first target UE or the second target UE via one of the first one or more anchor devices or one of the second one or more anchor devices.

Clause 54. The non-transitory computer-readable medium of any of clauses 49 to 52, wherein: the device is a server device, and the non-transitory computer-readable medium further comprises computer-executable instructions that, when executed by the device, cause the device to: configure a base station to send configuration information to the first target UE or the second target UE, the configuration information indicating a radio resource allocation for the RTT operation between the first target UE and the second target UE.

Clause 55. The non-transitory computer-readable medium of any of clauses 49 to 52, wherein: the device is the first target UE, and the non-transitory computer-readable medium further comprises computer-executable instructions that, when executed by the device, cause the device to: send a first request to the second target UE, wherein the first request requests the second target UE to transmit the second one or more anchor-to-target RTT measurements in response to the first request; send one or more second requests to the second one or more anchor devices, wherein the one or more second requests request the second one or more anchor devices to transmit the second one or more anchor-to-target RTT measurements in response to the one or more second requests; or send a third request to a server device, wherein the third request requests the server device to transmit the second one or more anchor-to-target RTT measurements in response to the second request.

Clause 56. The non-transitory computer-readable medium of clause 55, further comprising computer-executable instructions that, when executed by the device, cause the device to: communicate with the second target UE to assign the first target UE, the second target UE, or both, to determine a second estimated position of the second target UE based on the first one or more anchor-to-target RTT measurements, the second one or more anchor-to-target RTT measurements, and the target-to-target RTT measurement.

Clause 57. The non-transitory computer-readable medium of any of clauses 55 to 56, further comprising computer-executable instructions that, when executed by the device, cause the device to: determine a second estimated position of the second target UE based on the first one or more anchor-to-target RTT measurements, the second one or more anchor-to-target RTT measurements, and the target-to-target RTT measurement; and send location information indicating the second estimated position of the second target UE to the second target UE.

Clause 58. The non-transitory computer-readable medium of any of clauses 55 to 57, wherein the first request includes anchor device identifiers identifying the second one or more anchor devices.

Clause 59. The non-transitory computer-readable medium of any of clauses 55 to 58, further comprising computer-executable instructions that, when executed by the device, cause the device to: receive, from the second target UE, the second one or more anchor-to-target RTT measurements together with anchor device identifiers identifying the second one or more anchor devices.

Clause 60. The non-transitory computer-readable medium of any of clauses 55 to 59, further comprising computer-executable instructions that, when executed by the device, cause the device to determine whether the second one or more anchor-to-target RTT measurements are to be used for determination of the first estimated position of the first target UE, wherein the second one or more anchor-to-target RTT measurements are obtained based on the second one or more anchor-to-target RTT measurements being determined to be used for the determination of the first estimated position of the first target UE.

Clause 61. The non-transitory computer-readable medium of clause 60, wherein the second one or more anchor-to-target RTT measurements are determined to be used for the determination of the first estimated position of the first target UE based on: a number of common anchor devices belonging to both the first one or more anchor devices and the second one or more anchor devices being greater than a first threshold, an estimated distance between the first target UE and the second target UE being less than a second threshold, the target-to-target RTT measurement being less than a third threshold, or a combination thereof.

Clause 62. The non-transitory computer-readable medium of any of clauses 55 to 61, further comprising computer-executable instructions that, when executed by the device, cause the device to: perform the RTT operation between the first target UE and the second target UE based on discovering the second target UE.

Clause 63. The non-transitory computer-readable medium of any of clauses 55 to 61, further comprising computer-executable instructions that, when executed by the device, cause the device to: send a fourth request to the second target UE, a server device, or one of the first one or more anchor devices or one of the second one or more anchor devices, the fourth request requesting for a grant to perform the RTT operation between the first target UE and the second target UE.

Clause 64. The non-transitory computer-readable medium of clause 63, wherein at least one of the first request, the one or more second requests, the third request, or the fourth request is implemented based on a Medium Access Control (MAC) layer, Radio Resource Control (RRC) layer, Vehicle-to-Everything (V2X) layer, or application layer message.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a device, comprising:
   obtaining first one or more anchor-to-target round-trip time (RTT) measurements corresponding to one or more respective RTT operations between a first target user equipment (UE) and first one or more anchor devices;
   obtaining second one or more anchor-to-target RTT measurements corresponding to one or more respective RTT operations between a second target UE and second one or more anchor devices;
   obtaining a target-to-target RTT measurement corresponding to an RTT operation between the first target UE and the second target UE; and
   determining at least a first estimated position of the first target UE based on the first one or more anchor-to-target RTT measurements, the second one or more anchor-to-target RTT measurements, and the target-to-target RTT measurement.

2. The method of claim 1, further comprising:
   determining a second estimated position of the second target UE based on the first one or more anchor-to-target RTT measurements, the second one or more anchor-to-target RTT measurements, and the target-to-target RTT measurement.

3. The method of claim 1, further comprising determining whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

4. The method of claim 3, wherein the target-to-target RTT measurement is determined to be used for the determination of the first estimated position of the first target UE based on:
 a number of available anchor devices to the first target UE being less than a first threshold,
 a number of available anchor devices to the second target UE being less than a second threshold,
 a number of common anchor devices belonging to both the first one or more anchor devices and the second one or more anchor devices being greater than a third threshold,
 an estimated distance between the first target UE and the second target UE being less than a fourth threshold,
 the target-to-target RTT measurement being less than a fifth threshold,
 a request from the first target UE or the second target UE, the request requesting performing the RTT operation between the first target UE and the second target UE, or
 a combination thereof.

5. The method of claim 1, wherein:
 the device is a server device, and
 the method further comprises:
  sending one or more messages to the first target UE, the second target UE, or both, the one or more messages configuring the first target UE and the second target UE to perform the RTT operation between the first target UE and the second target UE; and
  receiving the target-to-target RTT measurement directly from the first target UE or the second target UE, or indirectly from the first target UE or the second target UE via one of the first one or more anchor devices or one of the second one or more anchor devices.

6. The method of claim 1, wherein:
 the device is a server device, and
 the method further comprises:
  configuring a base station to send configuration information to the first target UE or the second target UE, the configuration information indicating a radio resource allocation for the RTT operation between the first target UE and the second target UE.

7. The method of claim 1, wherein:
 the device is the first target UE, and
 the method further comprises:
  sending a first request to the second target UE, wherein the first request requests the second target UE to transmit the second one or more anchor-to-target RTT measurements in response to the first request;
  sending one or more second requests to the second one or more anchor devices, wherein the one or more second requests request the second one or more anchor devices to transmit the second one or more anchor-to-target RTT measurements in response to the one or more second requests; or
  sending a third request to a server device, wherein the third request requests the server device to transmit the second one or more anchor-to-target RTT measurements in response to the second request.

8. The method of claim 7, further comprising:
 communicating with the second target UE to assign the first target UE, the second target UE, or both, to determine a second estimated position of the second target UE based on the first one or more anchor-to-target RTT measurements, the second one or more anchor-to-target RTT measurements, and the target-to-target RTT measurement.

9. The method of claim 7, further comprising:
 determining a second estimated position of the second target UE based on the first one or more anchor-to-target RTT measurements, the second one or more anchor-to-target RTT measurements, and the target-to-target RTT measurement; and
 sending location information indicating the second estimated position of the second target UE to the second target UE.

10. The method of claim 7, wherein the first request includes anchor device identifiers identifying the second one or more anchor devices.

11. The method of claim 7, further comprising:
 receiving, from the second target UE, the second one or more anchor-to-target RTT measurements together with anchor device identifiers identifying the second one or more anchor devices.

12. The method of claim 7, further comprising determining whether the second one or more anchor-to-target RTT measurements are to be used for determination of the first estimated position of the first target UE, wherein the second one or more anchor-to-target RTT measurements are obtained based on the second one or more anchor-to-target RTT measurements being determined to be used for the determination of the first estimated position of the first target UE.

13. The method of claim 12, wherein the second one or more anchor-to-target RTT measurements are determined to be used for the determination of the first estimated position of the first target UE based on:
 a number of common anchor devices belonging to both the first one or more anchor devices and the second one or more anchor devices being greater than a first threshold,
 an estimated distance between the first target UE and the second target UE being less than a second threshold,
 the target-to-target RTT measurement being less than a third threshold, or
 a combination thereof.

14. The method of claim 7, further comprising:
 performing the RTT operation between the first target UE and the second target UE based on discovering the second target UE.

15. The method of claim 7, further comprising:
 sending a fourth request to the second target UE, a server device, or one of the first one or more anchor devices or one of the second one or more anchor devices, the fourth request requesting for a grant to perform the RTT operation between the first target UE and the second target UE.

16. The method of claim 15, wherein at least one of the first request, the one or more second requests, the third request, or the fourth request is implemented based on a Medium Access Control (MAC) layer, Radio Resource Control (RRC) layer, Vehicle-to-Everything (V2X) layer, or application layer message.

17. A device, comprising:
a memory; and
at least one processor communicatively coupled to the memory, the at least one processor configured to:
obtain first one or more anchor-to-target round-trip time (RTT) measurements corresponding to one or more respective RTT operations between a first target user equipment (UE) and first one or more anchor devices;
obtain second one or more anchor-to-target RTT measurements corresponding to one or more respective RTT operations between a second target UE and second one or more anchor devices;
obtain a target-to-target RTT measurement corresponding to an RTT operation between the first target UE and the second target UE; and
determine at least a first estimated position of the first target UE based on the first one or more anchor-to-target RTT measurements, the second one or more anchor-to-target RTT measurements, and the target-to-target RTT measurement.

18. The device of claim 17, wherein the at least one processor is further configured to:
determine a second estimated position of the second target UE based on the first one or more anchor-to-target RTT measurements, the second one or more anchor-to-target RTT measurements, and the target-to-target RTT measurement.

19. The device of claim 17, wherein the at least one processor is further configured to determine whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE.

20. The device of claim 19, wherein the target-to-target RTT measurement is determined to be used for the determination of the first estimated position of the first target UE based on:
a number of available anchor devices to the first target UE being less than a first threshold,
a number of available anchor devices to the second target UE being less than a second threshold,
a number of common anchor devices belonging to both the first one or more anchor devices and the second one or more anchor devices being greater than a third threshold,
an estimated distance between the first target UE and the second target UE being less than a fourth threshold,
the target-to-target RTT measurement being less than a fifth threshold,
a request from the first target UE or the second target UE, the request requesting performing the RTT operation between the first target UE and the second target UE, or
a combination thereof.

21. The device of claim 17, wherein:
the device is a server device, and
the at least one processor is further configured to:
send one or more messages to the first target UE, the second target UE, or both, the one or more messages configuring the first target UE and the second target UE to perform the RTT operation between the first target UE and the second target UE; and
receive the target-to-target RTT measurement directly from the first target UE or the second target UE, or indirectly from the first target UE or the second target UE via one of the first one or more anchor devices or one of the second one or more anchor devices.

22. The device of claim 17, wherein:
the device is a server device, and
the at least one processor is further configured to:
configure a base station to send configuration information to the first target UE or the second target UE, the configuration information indicating a radio resource allocation for the RTT operation between the first target UE and the second target UE.

23. The device of claim 17, wherein:
the device is the first target UE, and
the at least one processor is further configured to:
send a first request to the second target UE, wherein the first request requests the second target UE to transmit the second one or more anchor-to-target RTT measurements in response to the first request;
send one or more second requests to the second one or more anchor devices, wherein the one or more second requests request the second one or more anchor devices to transmit the second one or more anchor-to-target RTT measurements in response to the one or more second requests; or
send a third request to a server device, wherein the third request requests the server device to transmit the second one or more anchor-to-target RTT measurements in response to the second request.

24. The device of claim 23, wherein at least one of the first request, the one or more second requests, or the third request is implemented based on a Medium Access Control (MAC) layer, Radio Resource Control (RRC) layer, Vehicle-to-Everything (V2X) layer, or application layer message.

25. A device, comprising:
means for obtaining first one or more anchor-to-target round-trip time (RTT) measurements corresponding to one or more respective RTT operations between a first target user equipment (UE) and first one or more anchor devices;
means for obtaining second one or more anchor-to-target RTT measurements corresponding to one or more respective RTT operations between a second target UE and second one or more anchor devices;
means for obtaining a target-to-target RTT measurement corresponding to an RTT operation between the first target UE and the second target UE; and
means for determining at least a first estimated position of the first target UE based on the first one or more anchor-to-target RTT measurements, the second one or more anchor-to-target RTT measurements, and the target-to-target RTT measurement.

26. The device of claim 25, further comprising:
means for determining a second estimated position of the second target UE based on the first one or more anchor-to-target RTT measurements, the second one or more anchor-to-target RTT measurements, and the target-to-target RTT measurement.

27. The device of claim 25, further comprising means for determining whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE, wherein the target-to-target RTT measurement is determined to be used for the determination of the first estimated position of the first target UE based on:

a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

28. A non-transitory computer-readable medium storing computer-executable instructions that, when executed by a device, cause the device to:

obtain first one or more anchor-to-target round-trip time (RTT) measurements corresponding to one or more respective RTT operations between a first target user equipment (UE) and first one or more anchor devices;

obtain second one or more anchor-to-target RTT measurements corresponding to one or more respective RTT operations between a second target UE and second one or more anchor devices;

obtain a target-to-target RTT measurement corresponding to an RTT operation between the first target UE and the second target UE; and determine at least a first estimated position of the first target UE based on the first one or more anchor-to-target RTT measurements, the second one or more anchor-to-target RTT measurements, and the target-to-target RTT measurement.

29. The non-transitory computer-readable medium of claim 28, further comprising computer-executable instructions that, when executed by the device, cause the device to:

determine a second estimated position of the second target UE based on the first one or more anchor-to-target RTT measurements, the second one or more anchor-to-target RTT measurements, and the target-to-target RTT measurement.

30. The non-transitory computer-readable medium of claim 28, further comprising computer-executable instructions that, when executed by the device, cause the device to determine whether the target-to-target RTT measurement is to be used for determination of the first estimated position of the first target UE, wherein the target-to-target RTT measurement is obtained based on the target-to-target RTT measurement being determined to be used for the determination of the first estimated position of the first target UE, wherein the target-to-target RTT measurement is determined to be used for the determination of the first estimated position of the first target UE based on:

a number of available anchor devices to the first target UE being less than a first threshold, a number of available anchor devices to the second target UE being less than a second threshold, a number of common anchor devices belonging to both the first one or more anchor devices and the second one or more anchor devices being greater than a third threshold, an estimated distance between the first target UE and the second target UE being less than a fourth threshold, the target-to-target RTT measurement being less than a fifth threshold, a request from the first target UE or the second target UE, the request requesting performing the RTT operation between the first target UE and the second target UE, or a combination thereof.

* * * * *